(12) United States Patent
Tsubota et al.

(10) Patent No.: US 10,589,578 B2
(45) Date of Patent: *Mar. 17, 2020

(54) TIRE (71) Applicant: BRIDGESTONE CORPORATION, Tokyo (JP)

(72) Inventors: Takeshi Tsubota, Tokyo (JP); Yuji Oyama, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 34 days.

This patent is subject to a terminal disclaimer.

(21) Appl. No.: 15/554,794

(22) PCT Filed: Mar. 7, 2016

(86) PCT No.: PCT/JP2016/057033
§ 371 (c)(1),
(2) Date: Aug. 31, 2017

(87) PCT Pub. No.: WO2016/143755
PCT Pub. Date: Sep. 15, 2016

(65) Prior Publication Data
US 2018/0015791 A1    Jan. 18, 2018

(30) Foreign Application Priority Data

Mar. 6, 2015 (JP) .................. 2015-045302

(51) Int. Cl.
*B60C 17/00* (2006.01)
*C08L 15/00* (2006.01)
(Continued)

(52) U.S. Cl.
CPC ........ *B60C 17/0009* (2013.01); *B60C 9/0042* (2013.01); *B60C 15/0603* (2013.01);
(Continued)

(58) Field of Classification Search
CPC .............................................. B60C 2017/0063
See application file for complete search history.

(56) References Cited

U.S. PATENT DOCUMENTS 4,532,291 A * 7/1985 Hayashi ............... C08L 7/00
524/496
6,774,172 B1   8/2004 Nakamura
(Continued)

FOREIGN PATENT DOCUMENTS

CN     103387700 A    11/2013
EP     2 316 881 A1    5/2011
(Continued)

OTHER PUBLICATIONS

English machine translation of Nakagawa et al. (JP 2010-155550).*
(Continued)

*Primary Examiner* — Michael F Pepitone
(74) *Attorney, Agent, or Firm* — Sughrue Mion, PLLC (57) ABSTRACT

The present invention provides a tire improved in the run flat durability, having at least one member selected from the group consisting of a side reinforcing rubber layer and a bead filler using a rubber composition having a tensile stress at 50% elongation at 180° C. (M50) of 6.2 MPa or more as a vulcanized rubber physical property.

12 Claims, 1 Drawing Sheet

(51) Int. Cl.
  C08L 101/00 (2006.01)
  C08C 19/22 (2006.01)
  B60C 9/00 (2006.01)
  B60C 15/06 (2006.01)
  C08L 7/00 (2006.01)
  C08L 9/00 (2006.01)
  B60C 1/00 (2006.01)

(52) U.S. Cl.
  CPC ............... C08C 19/22 (2013.01); C08L 7/00 (2013.01); C08L 9/00 (2013.01); C08L 15/00 (2013.01); C08L 101/00 (2013.01); B60C 2001/0033 (2013.01); B60C 2001/0058 (2013.01); B60C 2009/0035 (2013.01); B60C 2009/0085 (2013.01); B60C 2009/0092 (2013.01); B60C 2017/0063 (2013.01)

(56) References Cited

U.S. PATENT DOCUMENTS

| | | | |
|---|---|---|---|
| 2006/0272760 A1* | 12/2006 | Teratani | B60C 1/0025 152/517 |
| 2011/0290396 A1* | 12/2011 | Nakagawa | B60C 1/00 152/450 |
| 2012/0000584 A1 | 1/2012 | Hahn et al. | |
| 2013/0303657 A1 | 11/2013 | Miyazaki | |
| 2014/0020809 A1* | 1/2014 | Yokokura | B60C 9/0042 152/527 |

FOREIGN PATENT DOCUMENTS

| | | | |
|---|---|---|---|
| EP | 2514607 | A1 | 10/2012 |
| EP | 2660370 | A2 | 11/2013 |
| JP | 50-34058 | B1 | 11/1975 |
| JP | H11-301224 | A | 11/1999 |
| JP | H11-310014 | A | 11/1999 |
| JP | 2000-301910 | A | 10/2000 |
| JP | 2009-214700 | A | 9/2009 |
| JP | 2010-155550 | A | 7/2010 |
| JP | 2010155550 | A * | 7/2010 |
| JP | 2012-6563 | A | 1/2012 |
| JP | 4928661 | B2 | 5/2012 |
| JP | 2014-166832 | A | 9/2014 |

OTHER PUBLICATIONS

Database WPI, Week 20130228, Thomson Scientific, London, GB; AN 2014-Q97860, XP002783313, total 2 pages.
Extended European Search Report dated Aug. 10, 2018 in European Patent Application No. 16761723.2.
Database WPI, Week 200003, Thomson Scientific, London, GB; AN 2000-032695, XP002778381, total 2 pages, copyright 2017.
Database WPI, Week 200006, Thomson Scientific, London, GB; AN 2000-065844, XP002778382, total 2 pages, copyright 2017.
Communication dated Apr. 3, 2018, from European Patent Office in counterpart application No. 16761723.2.
International Search Report for PCT/JP2016/057033, dated May 24, 2016.

* cited by examiner

TIRE

CROSS REFERENCE TO RELATED APPLICATIONS

This application is a National Stage of International Application No. PCT/JP2016/057033 filed Mar. 7, 2016, claiming priority based on Japanese Patent Application No. 2015-045302, filed Mar. 6, 2015, the contents of all of which are incorporated herein by reference in their entirety.

TECHNICAL FIELD

The present invention relates to a tire improved in a run flat durability.

BACKGROUND ART

In order to enhance a rigidity of the side wall part of a tire, particularly of a run flat tire, a side reinforcing layer using a rubber composition alone or a composite of a rubber composition, a fiber, and the like, has been conventionally arranged.

For example, in order to secure the run flat durability of the run flat tire without damage to the rolling resistance in normal running, a tire having a side reinforcing rubber layer and/or a bead filler using a rubber composition containing a mixture of a rubber component, 55 parts by mass or more of carbon black based on 100 parts by mass of the rubber component, a phenol resin and a methylene donor, having a modulus at 100% elongation (M100) after vulcanization of 10 MPa or more and a Σ value of loss tangent tan δ of 6.0 or less at 28° C. to 150° C. after vulcanization, is disclosed (refer to PTL1).

In PTL2, a pneumatic radial tire is proposed, in which a PET with low thermal shrinkage is used as a carcass reinforcing material to reduce surface irregularities occurring at the roll-up end of the carcass in a side portion, thereby achieving weight reduction and improved productivity of the tire.

However, along with improvement in performance of automobiles, particularly of passenger cars, further improvement in the run flat durability is required.

Furthermore, it is also required to improve the side cut resistance and the steering stability in normal running, together with the improvement in the run flat durability.

CITATION LIST

Patent Literature

PTL1: JP 2010-155550 A
PTL2: JP 2000-301910 A

SUMMARY OF INVENTION

Technical Problem

Under the situation described above, an object of the present invention is to provide a tire improved in the run flat durability, and the improvement in the side cut resistance of the tire and the steering stability in normal running being also achieved together with the improvement in the run flat durability.

Solution to Problem

Intense studies repeated by the present inventors in order to solve the problem described above have resulted in finding that the problem can be solved by having at least one member selected from the group consisting of a side reinforcing rubber layer and a bead filler using a rubber composition having a tensile stress at 50% elongation at 180° C. (M50) in a specific range, and, in addition thereto, by allowing the intermediate elongation and the toughness of a reinforcing cord of a carcass ply to satisfy a specific relation. The present invention has been completed based on the above knowledge.

In essence, the present invention provides the following [1] and [2].

[1] A tire having at least one member selected from the group consisting of a side reinforcing rubber layer and a bead filler using a rubber composition having a tensile stress at 50% elongation at 180° C. (M50) of 6.2 MPa or more as a vulcanized rubber physical property.

[2] A tire having, as a framework, a carcass layer comprising at least one carcass ply, a reinforcing cord of the carcass ply being an organic fiber cord having an intermediate elongation of 4.2% or less under a load of 1.5 cN/dtex and a toughness of 45 cN·%/dtex or more, and the tire having at least one member selected from the group consisting of the side reinforcing rubber layer and the bead filler using the rubber composition according to [1].

Advantageous Effects of Invention

According to the present invention, a tire improved in the run flat durability can be provided, and furthermore, the improvement in the side cut resistance of a tire and the improvement in the steering stability in normal running can be provided together with the improvement in the run flat durability.

DESCRIPTION OF EMBODIMENT

[Tire]

The tire of the present invention has at least one member selected from the group consisting of a side reinforcing rubber layer and a bead filler using a rubber composition comprising a rubber component having a tensile stress at 50% elongation at 180° C. (M50) of 6.2 MPa or more as a vulcanized rubber physical property. With a tensile stress at 50% elongation at 180° C. (M50) of 6.2 MPa or more as a vulcanized rubber physical property, the run flat durability of the tire can be substantially improved. The tensile stress at 50% elongation at 180° C. is usually 15.0 MPa or less, though the higher is the better.

After the tire of the present invention is left standing at 100° C. for 24 hours, the rubber composition has a tensile stress at 50% elongation at 180° C. (M50) of preferably 6.8 to 7.7 MPa as a vulcanized rubber physical property. With a stress in the range of 6.8 to 7.7 MPa, the run flat durability of the tire can be further improved, and the range is more preferably 6.9 to 7.7 MPa, and particularly preferably 6.9 to 7.1 MPa.

From the viewpoint of further reduction in heat generation of the side reinforcing rubber layer and/or the bead filler in run flat running, the rubber composition of the tire of the present invention has a tan δ of preferably 0.13 or less after vulcanization at an initial strain of 5%, a dynamic strain of 1%, a frequency of 52 Hz, and a measurement temperature of 180° C. The tan δ at a measurement temperature of 180° C. is usually 0.005 or more, though the smaller is the better without a specific lower limit. The upper limit of tan δ at a measurement temperature of 180° C. is preferably 0.12 or less, more preferably 0.08 or less, still more preferably 0.07 or less. The range from 0.005 or more to 0.07 or less is therefore most preferred.

Figure 1:
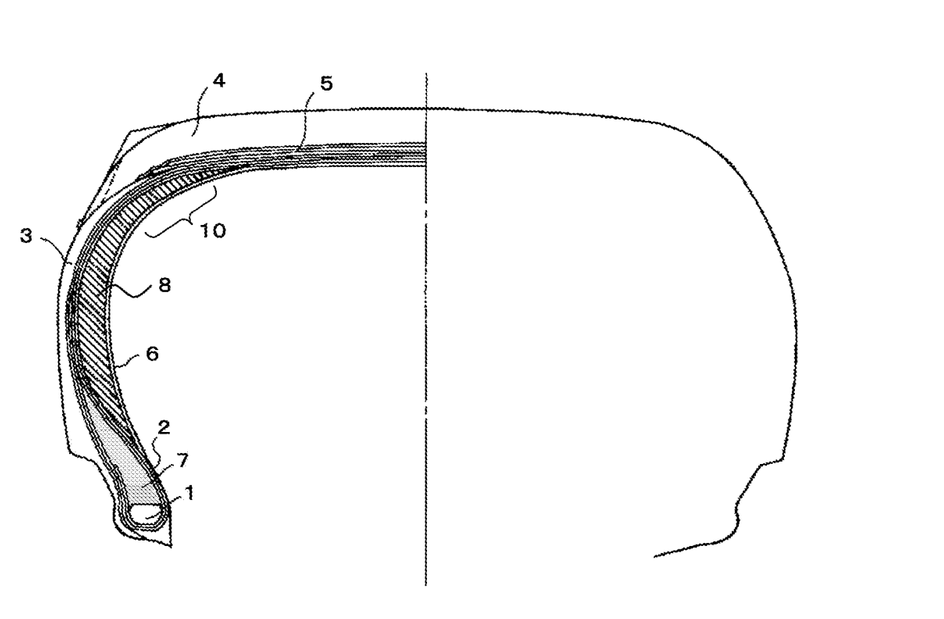
FIG. 1 is a schematic drawing showing a cross section in one embodiment of the tire of the present invention.

The arrangement of the side reinforcing rubber layer and the bead filler of the tire of the present invention is described as follows with reference to the drawings. FIG. 1 is a schematic drawing showing a cross section in one embodiment of the tire of the present invention, illustrating the arrangement of individual components of the tire of the present invention such as a bead filler 7, a side reinforcing rubber layer 8 and a carcass layer 2.

In FIG. 1, a suited embodiment of the tire of the present invention is a tire provided with a carcass layer 2 which is ranged toroidally over a space between a pair of bead cores 1, 1' (1' is not illustrated) and which comprises at least one radial carcass ply rolling up the above bead core 1 from an inside of the tire to an outside thereof at both end parts, a side rubber layer 3 which is arranged at an outside of a tire axial direction in a side region of the above carcass layer 2 to form an outside part, a tread rubber layer 4 which is arranged at an outside of a tire diameter direction in a crown region of the above carcass layer 2 to form a grounding part, a belt layer 5 which is arranged between the above tread rubber layer 4 and the crown region of the above carcass layer 2 to form a reinforcing belt, an inner liner 6 which is arranged on a whole surface of the carcass layer 2 at an inside of the tire to form an air proof film, a bead filler 7 which is arranged between a main body part of the carcass layer 2 extending from one bead core 1 to the other bead core 1' and a roll-up part rolled up on the above bead core 1 and at least one side reinforcing rubber layer 8 which is arranged between the carcass layer 2 and the inner liner 6 from a bead filler 7 side part to a shoulder zone 10 in a side region of the above carcass layer and in which a cross-sectional form along a rotational axis of the tire is approximately lunate. By using at least one member selected from the group consisting of the side reinforcing rubber layer 8 and the bead filler 7 using the rubber composition of the present invention, the tire of the present invention has improved run flat durability without damage to the rolling resistance in normal running.

The carcass layer 2 of the tire of the present invention may comprise at least one carcass ply or two or more carcass plies. The reinforcing cords of the carcass ply may be arranged at a substantially 90° to the circumferential direction of the tire, with an embedded cord count of 35 to 65 pieces/50 mm. Outside the crown region of the carcass 4 in the radial direction of the tire, a belt layer 5 comprising two layers of a first belt layer 5a and a second belt layer 5b is arranged, though the number of layers in the belt layer 5 is not limited thereto. A plurality of steel cords arranged in parallel in the width direction of the tire without twisting together may be embedded in rubber for use as the first belt layer 5a and the second belt layer 5b. For example, the first belt layer 5a and the second belt layer 5b may be arranged to cross each other at the interlayer, so that a crossed belt can be formed.

Outside the belt layer 5 in the radial direction of the tire of the present invention, a belt reinforcing layer (not shown in drawing) may be further arranged. The reinforcing cord of the belt reinforcing layer is preferably made from a high-modulus organic fiber to secure the tensile rigidity in the circumferential direction of the tire. An organic fiber cord of aromatic polyamide (aramid), polyethylene naphthalate (PEN), polyethylene terephthalate, rayon, Zylon (registered trade mark) (polyparaphenylene benzobisoxazol (PBO) fiber), or aliphatic polyamide (nylon) may be used as the organic fiber cord.

In the tire of the present invention, reinforcing components such as an insert and a flipper may be arranged besides the side reinforcing layer, though not shown in the drawing. The insert is a reinforcing material using a plurality of high-modulus organic fiber cords placed side by side and coated with rubber, so as to be arranged from the bead portion 3 to the side portion 2 in the circumferential direction of the tire (not shown in drawing). The flipper is a reinforcing material made of a plurality of high-modulus organic fiber cords placed side by side and coated with rubber, arranged between a main part of the carcass ply extending between the bead core 1 and 1' and a turnup part around the bead core 1 or 1', involving bead core 1 or 1' and at least a part of the bead filler 7 arranged outside thereof in the radial direction of the tire. The angle of the insert and the flipper is preferably 30 to 60° to the circumferential direction.

[Rubber Composition]

The rubber composition of the present invention used as at least one member selected from the group consisting of a side reinforcing rubber layer and a bead filler of the tire of the present invention, comprises a rubber composition prepared by mixing a rubber component containing 20% by mass or more of the modified conjugated diene based polymer (A), a reinforcing filler (B), a thermosetting resin (C), a thiuram based vulcanization accelerating agent (D), a vulcanization accelerating agent (E) other than the thiuram based vulcanization accelerating agent, and a sulfur-containing vulcanizing agent (F), wherein the rubber composition is prepared by mixing 40 to 100 parts by mass of the reinforcing filler, 1.1 to 2.5 parts by mass of the thiuram based vulcanization accelerating agent, 2.0 to 6.0 parts by mass of the vulcanization accelerating agent other than the thiuram based vulcanization accelerating agent, and 2.0 to 10.0 parts by mass, in terms of a sulfur content, of the sulfur-containing vulcanizing agent based on 100 parts by mass of the rubber component, wherein the thermosetting resin is preferably mixed such that a mass ratio [amount of thermosetting resin mixed/amount of reinforcing filler mixed] of preferably 0.001 to 0.043 is obtained.

The mixed rubber composition (mixture) suppresses the decrease in the elastic modulus of the rubber composition at high temperature after vulcanization, so that a high elastic modulus is achieved to suitably satisfy Expression (1) described above. The high rigidity of the side reinforcing rubber layer and/or the bead filler at high temperature can be thereby secured.

(Rubber Component)

The rubber component of the rubber composition of the present invention preferably contains 20% by mass or more of a modified conjugated diene based polymer (A). The modified conjugated diene based polymer (A) of the rubber composition of the present invention may be used singly or in combination of two or more. With a content of the modified conjugated diene based polymer (A) of 20% by mass or more in the rubber component, further reduction in heat generation is favorably achieved. From this viewpoint, the content of the modified conjugated diene based polymer (A) in the rubber component is more preferably 35% by mass or more and still more preferably 40% by mass or more.

As the modified conjugated diene based polymer (A), those containing amine-modified conjugated diene based polymer can be preferably used to obtain a rubber composition which achieves reduction in heat generation, so that a tire having further improved run flat running durability can be made therefrom.

Preferred examples of the amine-modified conjugated diene based polymer include ones having a primary amino group protected with a removable group or a secondary amino group protected with a removable group as an amine functional group for modification introduced in the molecule, and ones having a silicon atom-containing functional group further introduced in the molecule.

Examples of the primary amino group protected with a removable group (also referred to as a protected primary amino group) include a N,N-bis(trimethylsilyl)amino group, and examples of the secondary amino group protected with a removable group include a N,N-(trimethylsilyl)alkylamino group. The N,N-(trimethylsilyl)alkylamino group-containing group may be any of a non-cyclic residue and a cyclic residue.

Among the amine-modified conjugated diene based polymers described above, a primary amine-modified conjugated diene based polymer modified with a protected primary amino group is suitably used.

Examples of the silicon atom-containing functional group include a hydrocarbyloxy silyl group and/or a silanol group comprising a silicon atom to which a hydrocarbyloxy group and/or a hydroxy group bonded.

Such a functional group for modification may be present at any of the polymerization initiation end, the side chain, and the active polymerization end of a conjugated diene based polymer. In the present invention, the functional group has an amino group protected with a removable group and at least one (e.g. one or two) silicon atom to which a hydrocarbyloxy group and a hydroxyl group are bonded, preferably at the polymerization end, more preferably at the same active polymerization end.

<Conjugated Diene Based Polymer>

The conjugated diene based polymer used for modification may be a homopolymer of conjugated diene compound, a copolymer of two or more conjugated diene compounds, or a copolymer of a conjugated diene compound and an aromatic vinyl compound.

The conjugate diene compound described above includes, for example, 1,3-butadiene, isoprene, 1,3-pentadiene, 2,3-dimethyl-1,3-butadiene, 2-phenyl-1,3-butadiene, 1,3-hexadiene and the like. They may be used alone or in combination of two or more kinds thereof, and among them, 1,3-pentadiene is particularly preferred.

The aromatic vinyl compound used for copolymerization with the conjugate diene compound includes, for example, styrene, α-methylstyrene, 1-vinylnaphthalene, 3-vinyltoluene, ethylvinylbenzene, divinylbenzene, 4-cyclohexylstyrene, 2,4,6-trimethylstyrene and the like. They may be used alone or in combination of two or more kinds thereof, and among them, styrene is particularly preferred.

As the conjugated diene based copolymer, at least one conjugated diene based copolymer selected from the group consisting of polybutadiene, polyisoprene, an isoprene-butadiene copolymer, an ethylene-butadiene copolymer, a propylene-butadiene copolymer and a styrene-butadiene copolymer is preferred, and polybutadiene is particularly preferred.

In order to react an active end of the conjugate diene based polymer with protected primary amine to modify it, the above conjugate diene based polymer is preferably provided with a living property or a pseudo-living property in at least 10% of a polymer chain. Polymerization reaction providing the above living property includes reaction in which a conjugate diene compound alone or a conjugate diene compound and an aromatic vinyl compound are subjected to anionic polymerization in an organic solvent using an organic alkali metal compound as an initiator or reaction in which a conjugate diene compound alone or a conjugate diene compound and an aromatic vinyl compound are subjected to coordinate anionic polymerization in an organic solvent by a catalyst containing a lanthanum series rare earth element compound. The former is preferred since it can provide a polymer having a high content of a vinyl bond in a conjugate diene part as compared with that in the latter. The heat resistance can be improved by enhancing the vinyl bond amount.

The organic alkali metal compound used as the initiator for the anionic polymerization described above is preferably an organic lithium compound. The organic lithium compound shall not specifically be restricted, and hydrocarbyllithium and lithium amide compounds are preferably used. When hydrocarbyllithium of the former is used, a conjugate diene based polymer which has a hydrocarbyl group at a polymerization initiation end and in which the other end is a polymerization active site is obtained. Also, when the lithium amide compound of the latter is used, a conjugate diene based polymer which has a nitrogen-containing group at a polymerization initiation end and in which the other end is a polymerization active site is obtained.

The hydrocarbyllithium described above is preferably a product having a hydrocarbyl group having 2 to 20 carbon atoms, and it includes, for example, ethyllithium, n-propyllithium, isopropyllithium, n-butyllithium, sec-butyllithium, tert-octyllithium, n-decyllithium, phenyllithium, 2-naphthyllithium, 2-butylphenyllithium, 4-phenylbutyllithium, cyclohexyllithium, cyclopentyllithium and reaction products of diisopropenylbenzene and butyllithium. Among them, n-butyllithium is particularly suited.

On the other hand, the lithium amide compound includes, for example, lithium hexamethyleneimide, lithium pyrrolidide, lithium piperidide, lithium heptamethyleneimide, lithium dodecamethyleneimide, lithium dimethylamide, lithium diethylamide, lithium dibutylamide, lithium dipropylamide, lithium diheptylamide, lithium dihexylamide, lithium dioctylamide, lithium di-2-ethylhexylamide, lithium didecylamide, lithium N-methylpiperazide, lithium ethylpropylamide, lithium ethylbutylamide, lithium ethylbenzylamide, lithium methylphenethylamide and the like. Among them, cyclic lithium amide such as lithium hexamethyleneimide, lithium pyrrolidide, lithium piperidide, lithium heptamethyleneimide, lithium dodecamethyleneimide and the like are preferred from the viewpoints of an interaction effect to carbon black and a polymerization initiation ability, and lithium hexamethyleneimide and lithium pyrrolidide are particularly suited.

In general, compounds prepared in advance from secondary amines and lithium compounds can be used for the above lithium amide compounds, and they can be prepared as well in the polymerization system (in-Situ). Also, a use amount of the above polymerization initiator is selected preferably in a range of 0.2 to 20 millimole per 100 g of the monomer.

A method for producing the conjugate diene based polymer by the anionic polymerization using the organic lithium compounds described above as the polymerization initiator shall not specifically be restricted, and methods which have so far been publicly known can be used.

To be specific, the conjugate diene compound or the conjugate diene compound and the organic vinyl compound are subjected to anionic polymerization in the organic solvent which is inactive to the reaction, for example, a hydrocarbon based solvent such as aliphatic, alicyclic and aromatic hydrocarbon compounds using the lithium compounds described above as the polymerization initiator under the presence of a randomizer used if desired, whereby the targeted conjugate diene based polymer having an active end is obtained.

Further, when the organic lithium compounds is used as the polymerization initiator, not only the conjugate diene based polymer having an active end but also the copolymer of the conjugate diene compound and the organic vinyl compound which has an active end can efficiently be obtained as compared with a case where the catalyst containing the lanthanum based rear earth element compound described above is used.

The hydrocarbon base solvent described above is preferably hydrocarbons having 3 to 8 carbon atoms, and capable of being listed are, for example, propane, n-butane, isobutane, n-pentane, isopentane, n-hexane, cyclohexane, propene, 1-butene, isobutene, trans-2-butene, cis-2-butene, 1-pentene, 2-pentene, 1-hexene, 2-hexene, benzene, toluene, xylene, ethylbenzene and the like. They may be used alone or in a mixture of two or more kinds thereof.

A concentration of the monomer in the solvent is preferably 5 to 50% by mass, more preferably 10 to 30% by mass. When the conjugate diene compound and the aromatic vinyl compound are used to copolymerize them, a content of the organic vinyl compound in the charged monomer mixture falls preferably in a range of 55% by mass or less.

The randomizer used if desired is a compound having actions such as controlling of a micro structure of the conjugate diene based polymer, for example, an increase in a 1,2-bond of a butadiene part in a butadiene-styrene copolymer and a 3,4-bond in an isoprene polymer, controlling of a composition distribution of a monomer unit in a conjugate diene compound-aromatic vinyl compound copolymer, for example, randomization of a butadiene unit and a styrene unit in a butadiene-styrene copolymer. The above randomizer shall not specifically be restricted, and optional compounds suitably selected from publicly known compounds usually used as a randomizer can be used. To be specific, capable of being listed are ethers and tertiary amines such as dimethoxybenzene, tetrahydrofuran, dimethoxyethane, diethylene glycol dibutyl ether, diethylene glycol dimethyl ether, oxolanylpropane oligomers (particularly oligomers containing 2,2-bis(2-tetrahydrofuryl)-propane), triethylamine, pyridine, N-methylmorpholine, N,N,N',N'-tetramethylethylenediamine, 1,2-piperidinoethane and the like. Further, potassium salts such as potassium tert-amylate, potassium tert-butoxide and the like and sodium salts such as sodium tert-amylate and the like can be used as well.

The above randomizers may be used alone or in combination of two or more kinds thereof. A use amount thereof is selected preferably in a range of 0.01 to 1000 mole equivalent per mole of the lithium compound.

Temperature in the above polymerization reaction is selected in a range of preferably 0 to 150° C., more preferably 20 to 130° C. The polymerization reaction can be carried out under pressure generated, and usually, it is operated preferably at pressure which is sufficient for maintaining the monomer substantially in a liquid phase. That is, though depending on the respective materials subjected to the polymerization, the polymerization medium used and the polymerization temperature, the higher pressure can be used if desired, and the above pressure can be obtained by a suitable method such as applying pressure to the reactor by gas which is inert to the polymerization reaction.

<Modifying Agent>

In the present invention, the reaction of the active end of a conjugated diene based polymer having the active end obtained as described above with a protected primary amine compound as a modifier enables manufacturing of a primary amine-modified conjugated diene based polymer, and the reaction with a protected secondary amine compound enables manufacturing of a secondary amine-modified conjugated diene based polymer. As the protected primary amine compound, an alkoxysilane compound having a protected primary amine group is suitably used, and as the protected secondary amine compound, an alkoxysilane compound having a protected secondary amine group is suitably used.

The alkoxysilane compounds having a protected primary amino group which are used as the above modifying agent include, for example, N,N-bis(trimethylsilyl)aminopropylmethyldimethoxysilane, 1-trimethylsilyl-2,2-dimethoxy-1-aza-2-silacyclopentane, N,N-bis(trimethylsilyl)aminopropylmethyltrimethoxysilane, N,N-bis(trimethylsilyl)aminopropylmethyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)aminoethyltriethoxysilane, N,N-bis(trimethylsilyl)aminoethylmethyldimethoxysilane, N,N-bis(trimethylsilyl)aminoethylmethyldiethoxysilane and the like, and they are preferably N,N-bis(trimethylsilyl)aminopropylmethyldimethoxysilane, N,N-bis(trimethylsilyl)aminopropylmethyldiethoxysilane or 1-trimethylsilyl-2,2-dimethoxy-1-aza-2-silacyclopentane.

Further, the modifying agents include as well alkoxysilane compounds having a protected secondary amino group such as N-methyl-N-trimethylsilylaminopropyl(methyl)dimethoxysilane, N-methyl-N-trimethylsilylaminopropyl(methyl)diethoxysilane, N-trimethylsilyl(hexamethyleneimine-2-yl)propyl(methyl)dimethoxysilane, N-trimethylsilyl(hexamethyleneimine-2-yl)propyl(methyl)diethoxysilane, N-trimethylsilyl(pyrrolidine-2-yl)propyl(methyl)dimethoxysilane, N-trimethylsilyl(pyrrolidine-2-yl)propyl(methyl)diethoxysilane, N-trimethylsilyl(piperidine-2-yl)propyl(methyl)dimethoxysilane, N-trimethylsilyl(piperidine-2-yl)propyl(methyl)diethoxysilane, N-trimethylsilyl(imidazole-2-yl)propyl(methyl)dimethoxysilane, N-trimethylsilyl(imidazole-2-yl)propyl(methyl)diethoxysilane, N-trimethylsilyl(4,5-dihydroimidazole-5-yl)propyl(methyl)dimethoxysilane, N-trimethylsilyl(4,5-dihydroimidazole-5-yl)propyl(methyl)diethoxysilane and the like; alkoxysilane compounds having an imino group such as N-(1,3-dimethylbutylidene)-3-(triethoxysilyl)-1-propaneamine, N-(1-methylethylidene)-3-(triethoxysilyl)-1-propaneamine, N-ethylidene-3-(triethoxysilyl)-1-propaneamine, N-(1-methylpropylidene)-3-(triethoxysilyl)-1-propaneamine, N-(4-N,N-dimthylaminobenzylidene)-3-(triethoxysilyl)-1-propaneamine, N-(cyclohexylidene)-3-(triethoxysilyl)-1-propaneamine and the like; alkoxysilane compounds having an amino group such as 3-dimethylaminopropyl(triethoxy)silane, 3-dimethylaminopropyl(trimethoxy)silane, 3-diethylaminopropyl(triethoxy)silane, 3-diethylaminopropyl(trimethoxy)silane, 2-dimethylaminoethyl(triethoxy)silane, 2-dimethylaminoethyl(trimethoxy)silane, 3-dimethylaminopropyl(diethoxy)methylsilane, 3-dibutylaminopropyl(triethoxy)silane and the like.

The above modifying agents may be used alone or in combination of two or more kinds thereof. Also, the above modifying agents may be partial condensation products.

In this connection, the partial condensation products mean the modifying agents in which a part (not all) of SiOR is converted into a SiOSi bond by condensation.

In modifying reaction carried out by the modifying agent described above, a use amount of the above modifying agent is preferably 0.5 to 200 mmol/kg·conjugate diene based polymer. The above use amount is more preferably 1 to 100 mmol/kg·conjugate diene based polymer, particularly preferably 2 to 50 mmol/kg·conjugate diene based polymer. In this regard, the conjugate diene based polymer means a mass of the polymer alone which does not contain additives such as an antioxidant and the like added in the production or after the production. Controlling a use amount of the modifying agent to the ranges described above makes a reinforcing filler, particularly carbon black excellent in a dispersibility and allows the rapture characteristic and the low heat generation property after vulcanization to be improved.

An adding method of the modifying agents described above shall not specifically be restricted and includes a method in which they are added in one lot, a method in which they are added in a divided lot, a method in which they are added continuously and the like, and the method in which they are added in one lot is preferred.

Also, the modifying agent can be bonded to any of a principal chain and a side chain of the polymer in addition to a polymerization initiating end and a polymerization finishing end thereof, and it is introduced preferably into the polymerization initiating end or the polymerization finishing end from the viewpoint that energy can be inhibited from disappearing from an end of the polymer to improve the low heat generation property.

<Condensation Accelerator>

In the present invention, a condensation accelerator is preferably used in order to accelerate condensation reaction in which the alkoxysilane compound having a protected primary amino group used as the modifying agent described above participates.

Capable of being used as the above condensation accelerator are compounds having a tertiary amino group or organic compounds having at least one element belonging to any of a 3rd group, a 4th group, a 5th group, a 12th group, a 13th group, a 14th group and a 15th group in the periodic table (long periodic table). Further, the condensation accelerator is preferably alkoxides, carboxylates or acetylacetonate complex salts containing at least one metal selected from the group consisting of titanium (Ti), zirconium (Zr), bismuth (Bi), aluminum (Al) and tin (Sn).

The condensation accelerator used above can be added before the modification reaction described above, but it is preferably added to the modification reaction system in the middle of the modification reaction and/or after finishing it. When it is added before the modification reaction, it is reacted directly with the active end, and the hydrocarbyloxy group having a protected primary amino group is not introduced into the active end in a certain case.

An addition timing of the condensation accelerator is usually after 5 minutes to 5 hours since initiating the modification reaction, preferably after 15 minutes to 1 hour since initiating the modification reaction.

Capable of being listed as the condensation accelerator are, to be specific, compounds containing titanium, such as tetramethoxytitanium, tetraethoxytitanium, tetra-n-propoxytitanium, tetraisopropoxytitanium, tetra-n-butoxytitanium, tetra-n-butoxytitanium oligomers, tetra-sec-butoxytitanium, tetra-tert-butoxytitanium, tetra(2-ethylhexyl) titanium, bis(octanedioleate)bis(2-ethylhexyl)titanium, tetra (octanedioleate)titanium, titanium lactate, titanium dipropoxybis(triethanolaminate), titanium dibutoxybis(triethanolaminate), titanium tributoxystearate, titanium tripropoxystearate, titanium ethylhexyldioleate, titanium triprop oxyacetylacetonate, titanium dipropoxybis(acetylacetonate), titanium tripropoxyethylacetoacetate, titanium propoxyacetylacetonatebis(ethylacetoacetate), titanium tributoxyacetylacetonate, titanium dibutoxybis(acetylacetonate), titanium tributoxyethylacetoacetate, titanium butoxyacetylacetonatebis(ethylacetoacetate), titanium tetrakis (acetylacetonate), titanium diacetylacetonatebis (ethylacetoacetate), bis(2-ethylhexanoate)titanium oxide, bis(laurate)titanium oxide, bis(naphthenate)titanium oxide, bis(stearate)titanium oxide, bis(oleate)titanium oxide, bis (linoleate)titanium oxide, tetrakis(2-ethylhexanoate)titanium, tetrakis(laurate)titanium, tetrakis(naphthenate)titanium, tetrakis(stearate)titanium, tetrakis(oleate)titanium, tetrakis(linoleate)titanium and the like.

Further, capable of being listed as the condensation accelerator are, for example, tris(2-ethylhexanoate)bismuth, tris (laurate)bismuth, tris(naphthenate)bismuth, tris(stearate)bismuth, tris(oleate)bismuth, tris(linoleate)bismuth, tetraethoxyzirconium, tetra-n-propoxyzirconium, tetraisopropoxyzirconium, tetra-n-butoxyzirconium, tetra-sec-butoxyzirconium, tetra-tert-butoxyzirconium, tetra(2-ethylhexyl)zirconium, zirconium tributoxystearate, zirconium tributoxyacetylacetonate, zirconium dibutoxybis(acetylacetonate), zirconium tributoxyethylacetoacetate, zirconium butoxyacetylacetonatebis(ethylacetoacetate), zirconium tetrakis(acetylacetonate), zirconium diacetylacetonatebis(ethylacetoacetate), bis(2-ethylhexanoate)zirconium oxide, bis (laurate)zirconium oxide, bis(naphthenate)zirconium oxide, bis(stearate)zirconium oxide, bis(oleate)zirconium oxide, bis(linoleate)zirconium oxide, tetrakis(2-ethylhexanoate) zirconium, tetrakis(laurate)zirconium, tetrakis(naphthenate) zirconium, tetrakis(stearate)zirconium, tetrakis(oleate)zirconium, tetrakis(linoleate)zirconium and the like.

Further, capable of being listed are triethoxyaluminum, tri-n-propoxyaluminum, triisopropoxyaluminum, tri-n-butoxyaluminum, tri-sec-butoxyaluminum, tri-tert-butoxyaluminum, tri(2-ethylhexyl)aluminum, aluminum dibutoxystearate, aluminum dibutoxyacetylacetonate, aluminum butoxybis(acetylacetonate), aluminum dibutoxyethylacetoacetate, aluminum tris(acetylacetonate), aluminum tris (ethylacetoacetate), tris(2-ethylhexanoate)aluminum, tris (laurate)aluminum, tris(naphthenate)aluminum, tris (stearate)aluminum, tris(oleate)aluminum, tris(linoleate) aluminum and the like.

Among the condensation accelerators described above, the titanium compounds are preferred, and the alkoxides of titanium metal, the carboxylates of titanium metal or the acetylacetonate complex salts of titanium metal are particularly preferred.

A use amount of the above condensation accelerators is preferably 0.1 to 10, particularly preferably 0.5 to 5 in terms of a mole ratio of a mole number of the compounds described above to a whole mole number of the hydrocarbyloxy groups present in the reaction system. The condensation reaction is efficiently promoted by controlling a use amount of the condensation accelerators to the ranges described above.

The condensation reaction time is usually 5 minutes to 10 hours, preferably 15 minutes to 5 hours. Controlling the condensation reaction time to the ranges described above makes it possible to complete smoothly the condensation reaction.

Also, a pressure of the reaction system in the condensation reaction is usually 0.01 to 20 MPa, preferably 0.05 to 10 MPa.

<(A) Modified Conjugate Diene Based Polymer>

(A) The modified conjugate diene based polymer obtained in the manner described above has a Mooney viscosity ($ML_{1+4}$, 100° C.) of preferably 10 to 150, more preferably 15 to 100. When the Mooney viscosity is less than 10, the rubber physical properties including the rupture resistant characteristic are not sufficiently obtained, and when it exceeds 150, the operability is inferior to make it difficult to mix the polymer with the compounding agents.

Also, the non-vulcanized rubber composition according to the present invention which is mixed with (A) the modified conjugate diene based polymer described above has a Mooney viscosity ($ML_{1+4}$, 130° C.) of preferably 10 to 150, more preferably 30 to 100.

In (A) the modified conjugate diene based polymer used for the rubber composition according to the present invention, a ratio (Mw/Mn) of a weight average molecular weight (Mw) to a number average molecular weight (Mn), that is, a molecular weight distribution (Mw/Mn) is preferably 1 to 3, more preferably 1.1 to 2.7.

Controlling a molecular weight distribution (Mw/Mn) of (A) the modified conjugate diene based polymer within the ranges described above makes it easy to knead them without reducing an operability of the rubber composition when mixing the modified conjugate diene based polymer with the rubber composition and makes it possible to enhance sufficiently the physical properties of the rubber composition.

Further, (A) the modified conjugate diene based polymer used for the rubber composition according to the present invention has a number average molecular weight (Mn) of preferably 100,000 to 500,000, more preferably 150,000 to 300,000. Controlling a number average molecular weight of (A) the modified conjugate diene based polymer within the ranges described above inhibits a reduction in an elastic modulus of the vulcanized matter and an elevation in the hysteresis loss to obtain the excellent rupture resistant characteristic and provides the rubber composition containing (A) the above modified conjugate diene based polymer with an excellent kneading operability.

From the viewpoint of further reduction in heat generation, the modified conjugated diene based polymer (A) for use in the rubber composition of the present invention is preferably an amine-modified polybutadiene, more preferably a primary amine-modified polybutadiene or a secondary amine-modified polybutadiene, and particularly preferably a primary amine-modified polybutadiene.

The modified conjugated diene based polymer (A) of the present invention has a vinyl bond content in the butadiene portion of preferably 10% to 60% by mass, more preferably 12% to 60% by mass, an Mw of preferably 100,000 to 500,000, an Mw/Mn of preferably 2 or less, and a primary amino group content of preferably 2.0 to 10.0 mmol/kg.

<Other Rubber Components>

Among the rubber components of the present invention, examples of the other components optionally used in combination with the modified conjugated diene based polymer (A) described above include natural rubber and at least one diene based rubber selected from synthetic diene based rubbers other than the modified conjugated diene based polymer (A), of which the content is preferably 80% to 0% by mass to balance 20% to 100% by mass of the modified conjugated diene based polymer (A) in the rubber component. A content of the other rubber components of 65% to 0% by mass is more preferred to balance 35% to 100% by mass of the modified conjugated diene based polymer (A) in the rubber component. A content of the other rubber components of 60% to 0% by mass is still more preferred to balance 40% to 100% by mass of the modified conjugated diene based polymer (A) in the rubber component.

Examples of the synthetic diene based rubber described above include a styrene-butadiene copolymer (SBR), polybutadiene (BR), polyisoprene (IR), a styrene-isoprene copolymer (SIR), an ethylene-butadiene copolymer (EBR), a propylene-butadiene copolymer (PBR), butyl rubber (IIR), halogenated butyl rubber, an ethylene-propylene-diene terpolymer (EPDM) and a mixture thereof. A part or all of the other diene based synthetic rubbers is more preferably a diene based modified rubber which is provided with a branched structure by using a multifunctional modifying agent, for example, a modifying agent such as zinc tetrachloride.

(Reinforcing Filler (B))

In the rubber composition of the present invention, the content of reinforcing filler as component (B) is preferably 40 to 100 parts by mass based on 100 parts by mass of the rubber component. With a content of the reinforcing filler (B) of 40 parts by mass or more, the vulcanized rubber physical properties of the rubber composition obtained allow sufficient reinforcing effect to be exhibited. The content is more preferably 50 parts by mass or more, still more preferably 60 parts by mass or more. With a content of the reinforcing filler (B) of 100 parts by mass or less, for example, the loss tangent tan δ (at 25° C.) in the vulcanized rubber physical properties of the rubber composition obtained is not too high, so that lower fuel consumption (reduction in heat generation) and reduced rolling resistance in normal running can be achieved.

As the reinforcing filler (B) in the present invention, at least one selected from the group consisting of carbon black and silica is preferred. The reinforcing filler (B) containing 50% by mass or more of carbon black and 50% by mass or less of silica is more preferred and the reinforcing filler (B) of carbon black alone is particularly preferred.

In the case of using carbon black alone, the carbon black content is preferably 40 parts by mass or more and 100 parts by mass or less, more preferably 55 parts by mass or more and 100 parts by mass or less, based on 100 parts by mass of rubber component, from the viewpoint of the run flat durability.

In order to allow the rubber composition obtained to satisfy the vulcanized rubber physical properties described above, the carbon black used in the rubber composition of the present invention is preferably one selected from the group consisting of an FEF grade, an FF grade, an HAF grade, N339, an IISAF grade, an ISAF grade, and an SAF grade; and an FEF grade is particularly preferred.

As the silica, silica by wet method, silica by dry method and colloidal silica are preferred and silica by wet method is particularly preferred, though not specifically limited. One type of silica may be used alone, or two or more types of silica may be mixed for use.

(Thermosetting Resin (C))

Examples of the thermosetting resin (C) used in the present invention include a phenol resin, a melamine resin, a urea resin, an epoxy resin, an unsaturated polyester resin, a polyurethane resin, and thermosetting polyimide. Among these, at least one thermosetting resin selected from the group consisting of a phenol resin, a melamine resin and a urea resin is preferred, and a phenol resin is particularly preferred.

Examples of the phenol resin suitable as the thermosetting resin (C) include a novolac-type phenol resin, a novolac-type cresol resin, a novolac-type xylenol resin, a novolac-type resorcinol resin, and an oil-modified resin therefrom, and preferably at least one of the resins is used.

Examples of the oil used in oil modification of the phenolic resin described above include rosin oil, tall oil, cashew oil, linoleic oil, oleic acid, linolenic acid, and preferably at least one of these oils is used.

The melamine resin used as the thermosetting resin (C) is made from methylol melamine as raw material. The urea resin used as the thermosetting resin (C) is a reaction product obtained by mixing urea and formaldehyde at a molar ratio of 1:2 to 3.

The thermosetting resin (C) of the present invention is mixed such that a mass ratio [amount of thermosetting resin mixed/amount of reinforcing filler mixed] of preferably 0.001 to 0.043 is obtained. With a mass ratio [amount of thermosetting resin mixed/amount of reinforcing filler mixed] in the range, the tensile stress at high temperature (e.g. 180° C.) can be maintained high.

The content of the thermosetting resin (C) of the present invention based on 100 parts by mass of the rubber component is preferably 0.9 to 4.0 parts by mass, more preferably 0.9 to 3.5 parts by mass. With an amount of the thermosetting resin (C) mixed of 0.9 parts by mass or more, the rubber composition can have a higher elastic modulus after vulcanization, and the unvulcanized rubber composition can have improved workability. On the other hand, with an amount of the thermosetting resin (C) mixed of 4.0 parts by mass or less, more preferably 3.5 parts by mass or less, the loss of flexibility of the rubber composition after vulcanization can be inhibited.

A conventional curing agent is usually mixed into these thermosetting resins (C) to cause a reaction for curing. Examples of the curing agent for phenol resins include at least one methylene donor selected from the group consisting of hexamethylenetetramine, hexamethoxymethylmelamine, paraformaldehyde, acetaldehyde ammonia, α-polyoxymethylene, a polyvalent methylolmelamine derivative, an oxazolidine derivative, and a polyvalent methylolated acetylene urea. Among them, at least one methylene donor selected from the group consisting of hexamethylenetetramine and hexamethoxymethylmelamine is more preferred from the viewpoint of obtaining a rubber composition having a higher curing rate and a higher elastic modulus. The amount of a methylene donor mixed is preferably 3 to 80 parts by mass, more preferably 3 to 60 parts by mass, still more preferably 3 to 50 parts by mass, and particularly preferably 3 to 40 parts by mass, based on 100 parts by mass of the phenol resin.

Although a melamine resin is sufficiently cured by heating and pressing without any curing agent, a curing agent such as citric acid, phthalic acid, and an organic carboxylate may be used.

As the curing agent for urea resins, dimethyl oxalate, phthalic anhydride, an organic halide, an amine hydrochloride, and a potential curing agent such as salicylic acid urea adduct are preferred.

As the curing agent for unsaturated polyester resins, an organic peroxide is used. As the curing agent for polyurethane resins, an isocyanate is used. As the curing agent for thermosetting polyimides, an epoxy compound is used.

(Thiuram Based Vulcanization Accelerating Agent (D))

Using a thiuram based vulcanization accelerating agent (D) as the vulcanization accelerating agent in the rubber composition of the present invention, the rubber composition can have a higher elastic modulus at high temperature after vulcanization and achieve further reduction in the heat generation (lower fuel consumption) after vulcanization. By the application of the rubber composition having a higher elastic modulus at high temperature (e.g. 180° C.) to the side reinforcing rubber of a tire, the deflection of the tire sidewall can be suppressed. Further, by the application of the rubber composition to the side reinforcing rubber of a tire, reduction in the heat generation can be achieved, so that the heat generation of the tire in run flat running can be suppressed and the rolling resistance of the tire in normal running can be reduced.

In the rubber composition of the present invention, the amount of a thiuram based vulcanization accelerating agent (D) mixed is preferably 1.1 to 2.5 parts by mass based on 100 parts by mass of the rubber component. Within the mixing range, a higher elastic modulus at high temperature after vulcanization and further reduction in the heat generation (lower fuel consumption) of the rubber composition after vulcanization can be achieved.

Examples of the thiuram based vulcanization accelerating agent (D) of the present invention include tetrakis(2-ethylhexyl)thiuram disulfide, tetramethylthiuram disulfide, tetraethylthiuram disulfide, tetrapropylthiuram disulfide, tetraisopropylthiuram disulfide, tetrabutylthiuram disulfide, tetrapentylthiuram disulfide, tetrahexylthiuram disulfide, tetraheptylthiuram disulfide, tetraoctylthiuram disulfide, tetranonylthiuram disulfide, tetradecylthiuram disulfide, tetradodecylthiuram disulfide, tetrastearylthiuram disulfide, tetrabenzylthiuram disulfide, tetramethylthiuram monosulfide, tetraethylthiuram monosulfide, tetrapropylthiuram monosulfide, tetraisopropylthiuram monosulfide, tetrabutylthiuram monosulfide, tetrapentylthiuram monosulfide, tetrahexylthiuram monosulfide, tetraheptylthiuram monosulfide, tetraoctylthiuram monosulfide, tetranonylthiuram monosulfide, tetradecylthiuram monosulfide, tetradodecylthiuram monosulfide, tetrastearylthiuram monosulfide, tetrabenzylthiuram monosulfide, and dipentamethylenethiuram tetrasulfide. Among these, tetrakis(2-ethylhexyl)thiuram disulfide and tetrabenzylthiuram disulfide are preferred due to easy control of the vulcanization rate.

<Other Vulcanization Accelerating Agent (E) Other than Thiuram Based Vulcanization Accelerating Agent>

In order to further enhance the mixing effect of a thiuram based vulcanization accelerating agent (D) in the rubber composition of the present invention, mixing of a vulcanization accelerating agent (E) other than the thiuram based vulcanization accelerating agent is preferred.

The amount of the vulcanization accelerating agent (E) other than a thiuram based vulcanization accelerating agent mixed is preferably 2.0 to 6.0 parts by mass based on 100 parts by mass of the rubber component. Within the mixing range, the effect of use in combination with the thiuram based vulcanization accelerating agent (D) can be enhanced.

As described above, by increasing the amounts of a thiuram based vulcanization accelerating agent (D) and a vulcanization accelerating agent (E) other than a thiuram based vulcanization accelerating agent as the vulcanization accelerating agents of the present invention, the elastic modulus at high temperature of the rubber composition after vulcanization can be further increased, and further reduction in the heat generation (lower fuel consumption) of the rubber composition after vulcanization can be achieved.

Examples of the vulcanization accelerating agent (E) other than a thiuram based vulcanization accelerating agent of the present invention include at least one vulcanization accelerating agent selected from the group consisting of a sulfenamide based vulcanization accelerating agent, a thiazole based vulcanization accelerating agent, a thiourea based vulcanization accelerating agent, a guanidine based vulcanization accelerating agent, a dithiocarbamate based vulcanization accelerating agent and a xanthate based vulcanization accelerating agent. Among these, at least one vulcanization accelerating agent selected from the group consisting of a sulfenamide based vulcanization accelerating agent, a thiazole based vulcanization accelerating agent, a thiourea based vulcanization accelerating agent, and a guanidine based vulcanization accelerating agent is preferred.

Examples of the sulfenamide based vulcanization accelerating agent of the present invention include N-cyclohexyl-2-benzothiazolyl sulfenamide, N,N-dicyclohexyl-2-benzothiazolyl sulfenamide, N-tert-butyl-2-benzothiazolyl sulfenamide, N-oxydiethylene-2-benzothiazolyl sulfenamide, N-methyl-2-benzothiazolyl sulfenamide, N-ethyl-2-benzothiazolyl sulfenamide, N-propyl-2-benzothiazolyl sulfenamide, N-butyl-2-benzothiazolyl sulfenamide, N-pentyl-2-benzothiazolyl sulfenamide, N-hexyl-2-benzothiazolyl sulfenamide, N-pentyl-2-benzothiazolyl sulfenamide, N-octyl-2-benzothiazolyl sulfenamide, N-2-ethylhexyl-2-benzothiazolyl sulfenamide, N-decyl-2-benzothiazolyl sulfenamide, N-dodecyl-2-benzothiazolyl sulfenamide, N-stearyl-2-benzothiazolyl sulfenamide, N,N-dimethyl-2-benzothiazolyl sulfenamide, N,N-diethyl-2-benzothiazolyl sulfenamide, N,N-dipropyl-2-benzothiazolyl sulfenamide, N,N-dibutyl-2-benzothiazolyl sulfenamide, N,N-dipentyl-2-benzothiazolyl sulfenamide, N,N-dihexyl-2-benzothiazolyl sulfenamide, N,N-dipentyl-2-benzothiazolyl sulfenamide, N,N-dioctyl-2-benzothiazolyl sulfenamide amide, N,N-di-2-ethylhexyl-benzothiazolyl sulfenamide, N-decyl-2-benzothiazolyl sulfenamide, N,N-didodecyl-2-benzothiazolyl sulfenamide, and N,N-distearyl-2-benzothiazolyl sulfenamide. Among these, N-cyclohexyl-2-benzothiazolyl sulfenamide, N-tert-butyl-2-benzothiazolyl sulfenamide and N,N-dicyclohexyl-2-benzothiazolyl sulfenamide are preferred due to easy control of the vulcanization rate.

Examples of the thiazole based vulcanization accelerating agent of the present invention include 2-mercaptobenzothiazole, bis(4-methyl-benzothiazolyl-2)-disulfide, di-2-benzothiazolyl disulfide, zinc salt of 2-mercaptobenzothiazole, cyclohexylamine salt of 2-mercaptobenzothiazole, 2-(N,N-diethylthiocarbamoylthio)benzothiazole, 2-(4'-morpholino-dithio)benzothiazole, 4-methyl-2-mercaptobenzothiazole, di-(4-methyl-2-benzothiazolyl)disulfide, 5-chloro-2-mercaptobenzothiazole, 2-mercaptobenzothiazole sodium, 2-mercapto-6-nitrobenzothiazole, 2-mercapto-naphtho[1,2-d]thiazole, 2-mercapto-5-methoxybenzothiazole, 6-amino-2-mercaptobenzothiazole. Among these, at least one compound selected from the group consisting of 2-mercaptobenzothiazole, bis(4-methyl-benzothiazolyl-2)-disulfide, and di-2-benzothiazolyl disulfide is preferred.

Examples of the thiourea based vulcanization accelerating agent of the present invention include thiourea, N,N'-diphenylthiourea, trimethylthiourea, N,N'-diethylthiourea, N,N'-dimethylthiourea, N,N'-dibutylthiourea, ethylenethiourea, N,N'-diisopropylthiourea, N,N'-dicyclohexylthiourea, 1,3-di(o-tolyl)thiourea, 1,3-di(p-tolyl)thiourea, 1,1-diphenyl-2-thiourea, 2,5-dithiobiurea, guanylthiourea, 1-(1-naphthyl)-2-thiourea, 1-phenyl-2-thiourea, p-tolylthiourea, and o-tolylthiourea. Among these, at least one compound selected from the group consisting of thiourea, N,N'-diethylthiourea, trimethylthiourea, N,N'-diphenylthiourea and N,N'-dimethylthiourea is preferred.

As the guanidine based vulcanization accelerating agent of the present invention, at least one compound selected from the group consisting of 1,3-diphenylguanidine, 1,3-di-o-tolylguanidine, 1-o-tolylbiguanide and di-o-tolylguanidine salt of dicatechol borate is preferred, and 1,3-diphenylguanidine is particularly preferred.

Examples of the dithiocarbamate based vulcanization accelerating agent of the present invention include zinc dimethyldithiocarbamate, zinc diethyldithiocarbamate, zinc dipropyldithiocarbamate, zinc diisopropyldithiocarbamate, zinc dibutyldithiocarbamate, zinc dipentyldithiocarbamate, zinc dihexyldithiocarbamate, zinc diheptyldithiocarbamate, zinc dioctyldithiocarbamate, zinc di(2-ethylhexyl)dithiocarbamate, zinc didecyldithiocarbamate, zinc didodecyldithiocarbamate, zinc N-pentamethylenedithiocarbamate, zinc N-ethyl-N-phenyldithiocarbamate, zinc dibenzyldithiocarbamate, copper dimethyldithiocarbamate, copper diethyldithiocarbamate, copper dipropyldithiocarbamate, copper diisopropyldithiocarbamate, copper dibutyldithiocarbamate, copper dipentyldithiocarbamate, copper dihexyldithiocarbamate, copper diheptyldithiocarbamate, copper dioctyldithiocarbamate, copper di(2-ethylhexyl)dithiocarbamate, copper didecyldithiocarbamate, copper didodecyldithiocarbamate, copper N-pentamethylene dithiocarbamate, copper dibenzyldithiocarbamate, sodium dimethyldithiocarbamate, sodium diethyldithiocarbamate, sodium dipropyldithiocarbamate, sodium diisopropyldithiocarbamate, sodium dibutyldithiocarbamate, sodium dipentyldithiocarbamate, sodium dihexyldithiocarbamate, sodium diheptyldithiocarbamate, sodium dioctyldithiocarbamate, sodium di(2-ethylhexyl)dithiocarbamate, sodium didecyldithiocarbamate, sodium didodecyldithiocarbamate, sodium N-pentamethylenedithiocarbamate, sodium dibenzyldithiocarbamate, ferric dimethyldithiocarbamate, ferric diethyldithiocarbamate, ferric dipropyldithiocarbamate, ferric diisopropyldithiocarbamate, ferric dibutyldithiocarbamate, ferric dipentyldithiocarbamate, ferric dihexyldithiocarbamate, ferric diheptyldithiocarbamate, ferric dioctyldithiocarbamate, ferric di(2-ethylhexyl)dithiocarbamate, ferric didecyldithiocarbamate, ferric didodecyldithiocarbamate, ferric N-pentamethylenedithiocarbamate, and ferric dibenzyldithiocarbamate. Among these, at least one compound selected from the group consisting of zinc dibenzyldithiocarbamate, zinc N-ethyl-N-phenyldithiocarbamate, zinc dimethyldithiocarbamate and copper dimethyldithiocarbamate is preferred.

Examples of the xanthate based vulcanization accelerating agent of the present invention include zinc methylxanthate, zinc ethylxanthate, zinc propylxanthate, zinc isopropylxanthate, zinc butylxanthate, zinc pentylxanthate, zinc hexylxanthate, zinc heptylxanthate, zinc octylxanthate, zinc 2-ethylhexylxanthate, zinc decylxanthate, zinc dodecylxanthate, potassium methylxanthate, potassium ethylxanthate, potassium propylxanthate, potassium isopropylxanthate, potassium butylxanthate, potassium pentylxanthate, potassium hexylxanthate, potassium heptylxanthate, potassium octylxanthate, potassium 2-ethylhexylxanthate, potassium decylxanthate, potassium dodecylxanthate, sodium methylxanthate, sodium ethylxanthate, sodium propylxanthate, sodium isopropylxanthate, sodium butylxanthate, sodium pentylxanthate, sodium hexylxanthate, sodium heptylxanthate, sodium octylxanthate, sodium 2-ethylhexylxanthate, sodium decylxanthate, and sodium dodecylxanthate. Among these, zinc isopropylxanthate is preferred.

(Vulcanizing Agent)

Preferred examples of the vulcanizing agent of the present invention include at least one sulfur-containing vulcanizing agent selected from the group consisting of sulfur and sulfur donors, and the amount thereof mixed into 100 parts by mass of the rubber component is preferably 1.0 to 10.0 parts by mass in terms of a sulfur content, more preferably 2.0 to 10.0 parts by mass in terms of a sulfur content, and particularly preferably 2.0 to 8.0 parts by mass in terms of a sulfur content. With a sulfur content of 1.0 part by mass or more, the rupture strength, abrasion resistance and reduction in heat generation of the rubber composition after vulcanization are improved. With a sulfur content of 10.0 parts by mass or less, the rubber elasticity can be secured.

(Other Compounding Agent)

The rubber composition of the present invention may further contain various optional chemicals usually used in the rubber industry such as an antioxidant, a scorch inhibitor, zinc oxide, stearic acid and a process oil, within a range in which the effects of the present invention are not damaged.

Examples of the antioxidant for use in the rubber composition of the present invention include a 2,2,4-trimethyl-1,2-dihydroquinoline polymer, AW (6-ethoxy-1,2-dihydro-2,2,4-trimethylquinoline), a high-temperature condensate of diphenylamine and acetone, 6C [N-(1,3-dimethylbutyl)-N'-phenyl-p-phenylenediamine], and 3C (N-isopropyl-N'-phenyl-p-phenylenediamine). The amount thereof used is preferably 0.1 to 5.0 parts by mass, and more preferably 0.3 to 3.0 parts by mass based on 100 parts by mass of the rubber component.

As described above, it is important to control the amount of each compounding material mixed within an appropriate range for highly achieving both of the run flat durability and the riding comfort. It is, however, not sufficient to optimize the amount of the individual materials mixed only. It is important to control the balance of the amount of each material mixed within a specific range for achieving both of the high run flat durability and the riding comfort.

In other words, the outstanding effect is produced because the rubber composition is prepared by mixing a rubber component comprising 20% by mass or more of a modified conjugated diene based polymer, a reinforcing filler, a thermosetting resin, a thiuram based vulcanization accelerating agent, a vulcanization accelerating agent other than the thiuram based vulcanization accelerating agent, and a sulfur-containing vulcanizing agent, wherein the rubber composition is prepared by mixing 40 to 100 parts by mass of the reinforcing filler, 1.1 to 2.5 parts by mass of the thiuram based vulcanization accelerating agent, 2 to 6 parts by mass of the vulcanization accelerating agent other than the thiuram based vulcanization accelerating agent, and 2 to 10 parts by mass, in terms of a sulfur content, of the sulfur-containing vulcanizing agent based on 100 parts by mass of the rubber component, wherein the thermosetting resin is mixed such that a mass ratio [amount of thermosetting resin mixed/amount of reinforcing filler mixed] of 0.001 to 0.043 is obtained.

(Preparation of Rubber Composition)

The rubber composition of the present invention can be obtained by kneading the components according to the compounding formulation described above by a kneading machine such as a Banbury mixer, a roll, an internal mixer, and after subjected to mold processing, it is vulcanized and used as at least one member selected from the group consisting of the side reinforcing rubber layer 8 and the bead filler 7 of the tire shown in FIG. 1.

(Carcass Layer of Tire of the Present Invention)

Preferably, the tire of the present invention has, as a framework, a carcass layer comprising at least one carcass ply.

Preferably, a reinforcing cord of the carcass ply is an organic fiber cord having an intermediate elongation of 4.2% or less under a load of 1.5 cN/dtex and a toughness of 45 cN·%/dtex or more. The use of the reinforcing cord having a small dimensional change with an intermediate elongation of 4.2% or less can suppress the elongation of reinforcing cord caused by continuous strain of a tire in running, so that the durability and the steering stability of a tire can be improved. Although a reinforcing cord is usually subjected to a dip treatment for improvement of the adhesion to rubber, the reinforcing cord having a high intermediate elongation are deteriorated in some cases due to cracks in the adhesive layer on the surface of the reinforcing cord caused by continuous strain of a tire in running. However, by using a reinforcing cord having a small intermediate elongation as the reinforcing cord of the carcass ply of a tire of the present invention, the deterioration of the adhesive layer caused by continuous strain of a tire in running can be prevented. The intermediate elongation of the reinforcing cord of the carcass ply is preferably 4.0% or less, more preferably 3.8% or less. The reinforcing cord referred to herein means a reinforcing cord before a tire is manufactured.

Preferably, the reinforcing cord of the carcass ply removed from a product tire has an intermediate elongation of 6.0% or less under a load of 1.5 cN/dtex. In particular, the intermediate elongation of the reinforcing cord at the part turned down from the bead core 1, or 1' is controlled within the above range, so that excellence in both of the side cut resistance and the rigidity of a tire can be achieved.

The intermediate elongation is defined as an elongation (%) obtained in the tension test in accordance with JIS L 1017: 2002, in which one cord sampled from the reinforcing cords after dip treatment is heated at 145° C. for 3 minutes under a tension of 1.5 cN/dtex and, after cooling, subjected to the test under a tensile load 1.5 cN/dtex under a temperature condition of 25±2° C. The toughness is defined as the area under the strain-stress curve (S-S curve) from the origin to the breaking point of the reinforcing cord after dip treatment, the curve being obtained in the tension test under a temperature condition of 25±2° C. The reinforcing cord of the carcass ply of a tire of the present invention made as described above allows the side cut resistance and the steering stability to be balanced at a high level, and when applied to a run flat tire, excellent run flat durability can be obtained.

The tire of the present invention is a pneumatic tire which is suitably used as a run flat tire.

Further, with a toughness of the reinforcing cord of the carcass ply of a tire of the present invention of 45 cN·%/dtex or more, the steering stability and the side cut resistance of the side portion 2 can be improved at the same time. The toughness of the reinforcing cord is more preferably 50 cN·%/dtex or more, and still more preferably 55 cN·%/dtex or more. It should be noted that the toughness of the reinforcing cord can be adjusted by appropriately setting the type of dip solution, the dip temperature and clip time.

In the tire of the present invention, the reinforcing cord is subjected to an adhesive treatment using an adhesive comprising at least one selected from the group consisting of a thermoplastic polymer (A), a thermal reaction-type aqueous urethane resin (B) and an epoxide compound (C) as a one-bath treatment liquid, and a resorcinol-formalin latex adhesive as a two-bath treatment liquid, and a main chain of the thermoplastic polymer (A) comprises at least one of an ethylenic addition polymer and a urethane polymer having substantially no carbon-carbon double bond having addition reactivity and mainly composed of a straight chain-structure, and has at least one cross-linkable functional group as a pendant group.

In particular, by compounding (B) and (C), the adhesion between the reinforcing cord and the rubber can be enhanced. Incidentally, although the adhesion durability decreases under continuous strain as the stiffness increases, use of a reinforcing cord having a small intermediate elongation as the reinforcing cord of the carcass ply of a tire of the present invention suppresses the deformation amount of the entire cord as described above, so that the deterioration of the adhesive layer and the reduction in adhesive durability can be prevented. As an adhesive composition having the components (A) to (C) described above, the adhesive composition proposed in JP 4928661 B can be used.

Examples of the ethylenically unsaturated monomer having one carbon-carbon double bond as the monomer constituting the ethylenic addition polymer of a thermoplastic polymer (A) include: α-olefins such as ethylene, propylene, butylene, and isobutylene; α,β-unsaturated aromatic monomers such as styrene, α-methylstyrene, monochlorostyrene, vinyltoluene, vinylnaphthalene, and styrene sodium sulfonate; ethylenic carboxylic acids and salts thereof such as itaconic acid, fumaric acid, maleic acid, acrylic acid, methacrylic acid, and butene tricarboxylic acid; acid anhydrides such as maleic anhydride and itaconic anhydride; esters of unsaturated carboxylic acids such as methyl(meth)acrylate, ethyl(meth)acrylate, butyl(meth)acrylate, 2-ethylhexyl (meth)acrylate, polyethylene glycol methoxy(meth)acrylate, 2-hydroxyethyl(meth)acrylate, and 2-aminoethyl(meth) acrylate; monoesters of ethylenic dicarboxylic acids such as monoethyl itaconate, monobutyl fumarate, monobutyl maleate; diesters of ethylenical dicarboxylic acids such as diethyl itaconate and dibutyl fumarate; amides of α,β-ethylenically unsaturated acids such as acrylamide, maleic acid amide, N-methylol acrylamide, N-(2-hydroxyethyl) acrylamide, methacrylamide, N-methylol methacrylamide, N-(2-hydroxyethyl)methacrylamide, and maleic acid amide; hydroxyl group-containing monomers such as 2-hydroxyethyl(meth)acrylate, and polyethylene glycol mono(meth) acrylate; unsaturated nitriles such as acrylonitrile, methacrylonitrile, fumaronitrile, and α-chloroacrylonitrile; vinyl ethers such as methylvinyl ether and ethylvinyl ether; vinyl ketones; vinyl amides; halogen-containing α,β-unsaturated monomers such as vinyl chloride, vinylidene chloride, vinyl fluoride, and vinylidene fluoride; vinyl compounds such as vinyl acetate, vinyl valerate, vinyl caprylate, and vinyl pyridine; addition polymerizable oxazolines such as 2-isopropenyl-2-oxazoline; heterocyclic vinyl compounds such as vinyl pyrrolidone; and unsaturated bond-containing silane compounds such as vinyl ethoxy silane and α-methacryloxy propyltrimethoxy silane. These may be used alone or in combination of two or more. Preferably, the thermoplastic polymer (A) is obtained by the radical addition polymerization of these monomers.

Further, examples of the monomer containing two or more carbon-carbon double bonds as monomer constituting the main chain skeleton include conjugated diene based monomers such as 1,3-butadiene, 2-methyl-1,3-butadiene, 2,3-dimethyl-1,3-butadiene, and a halogen-substituted butadiene such as chloroprene. Examples of the non-conjugated diene based monomer include vinyl norbornene, dicyclopentadiene, and 1,4-hexadiene, which may be used alone, or in combination of two or more.

Further, examples of the monomer containing two or more carbon-carbon double bonds as monomer constituting the main chain skeleton include conjugated diene based monomers such as 1,3-butadiene, 2-methyl-1,3-butadiene, 2,3-dimethyl-1,3-butadiene, and a halogen-substituted butadiene such as chloroprene. Examples of the non-conjugated diene monomer include vinyl norbornene, dicyclopentadiene, and 1,4-hexadiene, which may be used alone, or in combination of two or more.

As the thermal reaction-type aqueous urethane resin (B), resins having a plurality of thermally dissociative blocked isocyanate groups in a molecule are preferably used. For example, thermal reaction-type aqueous polyurethane compounds represented by the following general formula are optimally used.

[Chemical Formula 1]

wherein A represents the isocyanate residue of an organic polyisocyanate compound having 3 to 5 functional groups, Y represents the active hydrogen residue of a blocking agent compound which liberates an isocyanate group by heat treatment, Z represents the active hydrogen residue of a compound having at least one active hydrogen atom and at least one anion-forming group in a molecule, X is the active hydrogen residue of a polyol compound having 2 to 4 hydroxyl groups and an average molecular weight of 5,000 or less, n is an integer of 2 to 4, and p+m is an integer of 2 to 4 (m≥0.25).

The epoxide compound (C) is preferably a compound containing epoxy groups or a reaction product of polyhydric alcohols and epichlorohydrin, though any compound having 2 or more, preferably 4 or more, epoxy groups in a molecule can achieve the object of the present invention. Specific examples of the epoxy compound include a reaction product of polyhydric alcohols and epichlorohydrin such as diethylene glycol diglycidyl ether, polyethylene diglycidyl ether, polypropylene glycol diglycidyl ether, neopentyl glycol diglycidyl ether, 1,6-hexanediol diglycidyl ether, glycerol polyglycidyl ether, trimethylolpropane polyglycidyl ether, polyglycerol polyglycidyl ether, pentaerythiol polyglycidyl ether, diglycerol polyglycidyl ether, and sorbitol polyglycidyl ether; a novolac-type epoxy resin such as a phenol novolac-type epoxy resin and a cresol novolac-type epoxy resin; and a bisphenol A-type epoxy resin. As the epoxide compound, sorbitol polyglycidyl ether or polyglycerol polyglycidyl ether is preferably used.

In the present invention, a mixed liquid of the components (A), (B) and (C) described above is preferably used as the one-bath treatment liquid. The dry weight content of each of the components in the adhesive composition is preferably as follows: component (A): 2 to 75%, component (B): 15 to 87%, and component (C): 11 to 70%.

Further, in the tire of the present invention, the thermal shrinkage rate of the reinforcing cord after heat treatment is preferably 0.5 to 3.0%. With a thermal shrinkage rate of the reinforcing cord of the carcass ply in the above range, disarrangement of the position of the reinforcing cord due to thermal shrinkage in the period from tire molding to vulcanization can be prevented. The rigidity of the tire, therefore, tends to be easily secured, so that the tire durability and the steering stability can be stably obtained. Preferably, a rate of 1.0 to 2.5% is preferred.

The thermal shrinkage rate is defined as a value obtained by dry heat treating a reinforcing cord after dip treatment under a load of 0.015 g/dtex, at 177° C. for 2 minutes in an oven, measuring the code length before and after the heat treatment, and applying the following Expression:

Heat shrinkage rate in dry heat treatment (%)={(Lb−La)/Lb}×100

In the Expression, La represents the code length after the heat treatment, and Lb represents the code length before heat treatment.

Preferably, the twist coefficient of the reinforcing cord of the carcass ply of the tire of the present invention is 0.30 to 0.50, more preferably 0.35 to 0.50. With a twist coefficient within the above range, the compression force applied to the reinforcing cord is moderated, so that reduction in fatigue durability of the carcass ply can be prevented. Further, decrease in the tensile elastic modulus of the reinforcing cord can be prevented, so that the rigidity of a tire can be sufficiently secured. In addition, a twist coefficient of the reinforcing cord of more than 0.50 is not preferred due to possible reduction in the productivity of the cord in the twisting process. The twist coefficient T is expressed by the following Expression:

$$T = N \times \sqrt{\{(0.125 \times D/2)/\rho\}} \times 10^{-3}$$

wherein N is the number of second twist (turn/10 cm), D is the total nominal decitex (fineness), $\rho$ is the specific gravity of cord material.

Although any organic fiber cord having an intermediate elongation of 4.2% or less under a load of 1.5 cN/dtex and a toughness of 45 cN·%/dtex or more can be used as the reinforcing cord of the carcass ply of a tire of the present invention, a cord made of polyester, particularly of inexpensive polyethylene terephthalate (PET), is preferred. Known structures may be employed as the other structures of a tire.

The reinforcing cord of the carcass ply of a tire of the present invention can be suitably applied to a run flat tire having a side reinforcing rubber layer arranged on the side portion.

The tire of the present invention has a pair of bead portions in which bead cores 1 and 1' are embedded respectively. A carcass layer 2 is turned down around the bead cores 1 and 1' from the inside to the outside of the tire so as to be engaged. The method for engaging the carcass layer 2 is not limited thereto, though. For example, at least one carcass ply of the carcass plies constituting the carcass layer 2, may be turned down around the bead cores 1 and 1' from the inside toward the outside in the tire width direction, so as to form a so-called envelope structure in which the turnup end is positioned between the belt layer 5 and the crown portion of the carcass layer 2. Furthermore, a tread pattern may be appropriately formed on the surface of the tread rubber layer 4, and an inner liner 6 may be formed on the innermost layer. The tire of the present invention may be filled with a gas such as normal air or air with a partial oxygen pressure changed, or an inert gas such as nitrogen. The tire of the present invention is suitably used as a pneumatic tire for passenger cars, particularly as a run flat tire for passenger cars.

(Manufacturing of Tire)

The tire of the present invention is manufactured by a conventional method for manufacturing a run flat tire having at least one member selected from the group consisting of a side reinforcing rubber layer 8 and a bead filler 7 using the rubber composition of the present invention. That is, the rubber composition according to the present invention prepared by adding various chemicals in the manner described above is processed into the respective members in a non-vulcanization stage, and the members are stuck and molded on a tire molding equipment by a conventional method, whereby a green tire is molded. The above green tire is heated and pressurized in a vulcanizing equipment to obtain a tire.

EXAMPLES

Next, the present invention shall be explained in further details with reference to prophetic examples, but the present invention shall by no means be restricted by the prophetic examples shown below.

The respective characteristics are measured according to the following methods.

<<Physical Properties of Modified Conjugate Diene Based Polymers>>

<Analytical Method of Micro Structure>

A content (% by mass) of the vinyl bond of a butadiene part is measured by an infrared method (Morello method).

<Measurements of Number Average Molecular Weight (Mn), Weight Average Molecular Weight (Mw) and Molecular Weight Distribution (Mw/Mn)>

Measure by means of GPC (HLC-8020, manufactured by Tosoh Corp.) using a refractometer as a detector and show in terms of polystyrene using monodispersed polystyrene as a standard. The column is GMHXL (manufactured by Tosoh Corp.), and the eluant is tetrahydrofuran.

<Measurement of Primary Amino Group Content (Mmol/Kg)>

First, the polymer is dissolved in toluene, and then it is precipitated in a large amount of methanol to separate an amino group-containing compound which is not bonded to the polymer from the rubber, and follow by drying it. The polymer which is subjected to the above treatment is used as a sample to quantitatively determine a whole amino group content thereof by "Testing method for total amine values" described in JIS K7237. Subsequently, the polymer which is subjected to the treatment described above is used as a sample to quantitatively determine the contents of a secondary amino group and a tertiary amino group by "an acetylacetone blocked method". o-Nitrotoluene is used for the solvent dissolving the sample, and acetylacetone is added to carry out potentiometric titration by a perchloric acetic acid solution. The contents of a secondary amino group and a tertiary amino group are deducted from the whole amino group content to determine a primary amino group content (mmol), and it is divided by a mass of the polymer used for the analysis to thereby determine a content (mmol/kg) of a primary amino group bonded to the polymer.

<Physical Properties of Vulcanized Rubber of Rubber Composition>

From the side reinforcing rubber layer (in the circumferential direction at the central thickest part) and the bead filler (in the circumferential direction at the central part 10 mm away from the bead core) of each of the sample tires (passenger car radial tires having a tire size of 215/45ZR17), a slab sheet having a thickness of 2 mm is made for each of the following measurements. Each of the measured values is obtained as the arithmetic mean of the value of the side reinforcing rubber layer and the value of the bead filler.

<Tensile Stress at 50% Elongation>

In accordance with JIS K 6251: 2010 (using a test piece having a dumbbell shape No. 8), the tensile stress at 50% elongation is measured at 25° C. and 180° C.

<Loss Tangent Tan δ>

The specimen which is obtained from the slab sheet having a thickness 2 mm is subjected to measurement of the loss tangent tan δ under measurement conditions at an initial strain of 5%, a dynamic strain of 1%, a frequency 52 Hz, and a measurement temperature of 180° C., using a viscoelasticity analyzer VR-7110 manufactured by Ueshima Seisakusho Co., Ltd.

<Tensile Stress at 50% Elongation of Tire after Left Standing at 100° C. for 24 Hours>

Each of the sample tires (passenger car radial tires having a tire size of 215/45ZR17) is rim-assembled under atmospheric pressure, charged to an inner pressure of 230 kPa, and then left standing in a large oven with air at 100° C. circulating therein for 24 hours. Subsequently, from the side reinforcing rubber layer (in the circumferential direction at the central thickest part) and the bead filler (in the circumferential direction at the central part 10 mm away from the bead core) of each of the tires, slab sheets having a thickness of 2 mm are made, respectively, to measure the tensile stress at 50% elongation at 180° C. after the tire is left standing at 100° C. for 24 hours in accordance with JIS K 6251: 2010 (using a test piece having a dumbbell shape No. 8) in the same manner as described above.

<Performance Evaluation of Pneumatic Tire>

<Run Flat Durability>

In Examples 1 to 9 and Comparative Examples 1 to 2, each of the sample tires (passenger car radial tires having a tire size of 215/45ZR17) is rim-assembled under atmospheric pressure, charged to an inner pressure of 230 kPa, and then left standing in a room at 38° C. for 24 hours. Subsequently, the valve core is removed to obtain an atmospheric inner pressure for a running test on a drum under conditions at a load of 4.17 kN (425 kg), a velocity of 89 km/h, and a room temperature of 38° C. The running distance until failure of each of the sample tires is measured. The results which are obtained in Examples 1 to 9 and Comparative Examples 1 to 2 are indicated by the index based on the following Expression, with the running distance in Comparative Example 1 as a reference of 100. As the index increases, the better run flat durability can be obtained. The results which are obtained are shown in Table 1.

run flat durability (index)=(running distance of the test tire/running distance of the tire in Comparative Example 1)×100

In Examples 10 to 20, and Reference Examples 1 to 11, the air pressure of each tire 225/45R17 91Y (LI91=615 Kg) is set at 0 kPa (zero air pressure), and the tire mounted on a drum tester under a load of 4.5 kN is subjected to running at 80 km/h. Based on the running distance until failure, the tire in Example 17 is rated as C (index: 100). A tire having a far longer running distance than that of Example 17 is evaluated as extremely excellent and rated as A (index: 115 or more). A tire having a longer running distance than that of Example 17 is evaluated as good and rated as B (index: 105 or more and less than 115). A tire having a running distance equivalent to that of Example 17 is rated as C (index: more than 95 and less than 105). And a tire having a running distance less than that of Example 17 is rated as D (index: 95 or less). The results which are obtained are shown in Table 2. The rating C in Table 2 indicates excellent performance in the run flat durability, and the ratings A and B indicate even better results.

Further, in the following Reference Examples 1 to 11, based on the running distance until failure in the above test procedures, the tire in Reference Example 1 is rated as c (index: 100). A tire having a far longer running distance than that of Reference Example 1 is evaluated as extremely excellent and rated as a (index: 115 or more). A tire having a longer running distance than that of Reference Example 1 is evaluated as good and rated as b (index: 105 or more and less than 115). A tire having a running distance equivalent to that of Reference Example 1 is rated as c (index: more than 95 and less than 105). And a tire having a running distance less than that of Reference Example 1 is rated as d (index: 95 or less). The results which are obtained are shown in Table 4.

However, the tire rated as C (index: 100) in Example 17, is superior to the tire rated as c (index: 100) in Reference Example 1, having a far longer running distance. The tires rated as B (index: 105 or more and less than 115) in Examples are vastly superior to the tires rated as b (index: 105 or more and less than 115) in Reference Examples 2 to 8.

<Side Cut Resistance>

The test of a tire 225/45R17 91Y (LI91=615 Kg) at an air pressure of 220 kPa starts under a load of 3.00 kN. In the test method, the side portion of a rolling tire treads on a round pin-shaped jig is fixed to the floor. When no air leakage occurs after the test, the load which is applied to the tire is increased to repeat the test. In the following Examples 10 to 20, based on the load to cause air leakage in the above test procedures, the tire in Example 17 is rated as C (index: 100). A tire having a far larger load to cause air leakage than that of Example 17 is evaluated as extremely excellent and rated as A (index: 115 or more). A tire having a larger load to cause air leakage than that of Example 17 is evaluated as good and rated as B (index: 105 or more and less than 115). A tire having a load to cause air leakage equivalent to that of Example 17 is rated as C (index: more than 95 and less than 105). A tire having a load to cause air leakage smaller than that of Example 17 is rated as D (index: more than 60 and 95 or less). And a tire having a load to cause air leakage further smaller than that is rated as E (index: 60 or less). The results which are obtained are shown in Table 2. From the viewpoint of use as a tire, the evaluation results rated as A to D are preferred.

Further, in the following Reference Examples 1 to 11, based on the load to cause air leakage in the above test procedures, the tire in Reference Example 1 is rated as c (index: 100). A tire having a far larger load to cause air leakage than that of Reference Example 1 is evaluated as extremely excellent and rated as a (index: 115 or more). A tire having a larger load to cause air leakage than that of Reference Example 1 is evaluated as good and rated as b (index: 105 or more and less than 115). A tire having a load to cause air leakage equivalent to that of Reference Example 1 is rated as c (index: more than 95 and less than 105). And a tire having a smaller load to cause air leakage than that of Reference Example 1 is rated as d (index: 95 or less). The results which are obtained are shown in Table 3.

However, the tire rated as C (index: 100) in Example 17 is vastly superior to the tire rated as c (index: 100) in Reference Example 1. The tires rated as B (index: 105 or more and less than 115) in Examples are vastly superior to the tires rated as b (index: 105 or more and less than 115) in Reference Examples 2 to 8.

<Steering Stability>

Each of the tires 225/45R17 91Y (LI91=615 Kg) at an air pressure of 230 kPa is mounted on a dynamic tester under a load of 6.00 kN for measurement of the cornering power (CP). In the following Examples 10 to 20, based on the cornering power (CP) in the test procedures, the tire in Example 17 is rated as C (index: 100). A tire having a far larger cornering power (CP) than that of Example 17 is evaluated as extremely excellent and rated as A (index: 115 or more). A tire having a larger cornering power (CP) than that of Example 17 is evaluated as good and rated as B (index: 105 or more and less than 115). A tire having a cornering power (CP) equivalent to that of Example 17 is rated as C (index: more than 95 and less than 105). A tire having a cornering power (CP) smaller than that of Example 17 is rated as D (index: more than 60 and 95 or less). And a tire having a cornering power (CP) further smaller than that is rated as E (index: 60 or less). The results which are obtained are shown in Table 2. From the viewpoint of use as a tire, the evaluation results rated as A to D are preferred.

Further, in the following Reference Examples 1 to 11, based on the cornering power (CP) in the above test procedures, the tire in Reference Example 1 is rated as c (index: 100). A tire having a far larger cornering power (CP) than that of Reference Example 1 is evaluated as extremely excellent and rated as a (index: 115 or more). A tire having a larger cornering power (CP) than that of Reference Example 1 is evaluated as good and rated as b (index: 105 or more and less than 115). A tire having a cornering power (CP) equivalent to that of Reference Example 1 is rated as c (index: more than 95 and less than 105). And a tire having a smaller cornering power (CP) than that of Reference Example 1 is rated as d (index: 95 or less). The results which are obtained are shown in Table 3.

However, the tire rated as C (index: 100) in Example 17 is vastly superior to the tire rated as c (index: 100) in Reference Example 1. The tires rated as B (index: 105 or more and less than 115) in Examples are vastly superior to the tires rated as b (index: 105 or more and less than 115) in Reference Examples 2 to 8.

Manufacturing Example 1: Manufacturing of Modified Conjugated Diene Based Polymer (1) Manufacturing of Unmodified Polybutadiene A 5 L autoclave substituted with nitrogen is charged with 1.4 kg of cyclohexane, 250 g of 1,3-butadiene and 2,2-ditetrahydrofurylpropane (0.0285 mmol) in the form of a cyclohexane solution under nitrogen flow, and after 2.85 mmol of n-butyllithium (BuLi) is added thereto, polymerization is carried out for 4.5 hours in a warm water bath of 50° C. equipped with a stirring device. A reaction conversion rate of 1,3-butadiene is almost 100%. A part of the above polymer solution is put in a methanol solution containing 1.3 g of 2,6-di-tert-butyl-p-cresol to terminate the polymerization, and then the solvent is removed by steam stripping. The resulting solid matter is dried on a roll of 110° C. to obtain polybutadiene before modification. The polybutadiene before modification which is thus obtained is used to measure a micro structure (vinyl bonding amount), a weight average molecular weight (Mw) and a molecular weight distribution (Mw/Mn). The results thereof showed show a vinyl bonding amount of 14% by mass, Mw of 150,000 and Mw/Mn of 1.1.

(2) Production of Primary Amine-Modified Polybutadiene

The polymer solution which is obtained in (1) described above is maintained at a temperature of 50° C. without deactivating the polymerization catalyst, and 1129 mg (3.364 mmol) of N,N-bis(trimethylsilyl)aminopropylmethyldiethoxysilane in which a primary amino group is protected is added thereto to carry out modification reaction for 15 minutes. Lastly, 2,6-di-tert-butyl-p-cresol is added to the polymer solution after the reaction. Then, desolvent and deprotection of the protected primary amino group are carried out by steam stripping, and the rubber is dried by a hot roll which is controlled at a temperature of 110° C. to obtain primary amine-modified polybutadiene. The primary amine-modified polybutadiene which is thus obtained is used to measure a micro structure (vinyl bonding amount), a weight average molecular weight (Mw), a molecular weight distribution (Mw/Mn) and a primary amino group content. The results thereof show a vinyl bonding amount of 14% by mass, Mw of 150,000, Mw/Mn of 1.2 and a primary amino group content of 4.0 mmol/kg.

Examples 1 to 9 and Comparative Examples 1 to 2

Eleven types of rubber compositions having 11 types of compounding recipes shown in Table 1 are prepared. Using side reinforcing rubber layer 8 and the bead filler 7 shown in FIG. 1 using these 11 types of rubber compositions, passenger car radial run flat tires having a tire size of 215/45ZR17 are manufactured, respectively, by the conventional method. As the physical properties of each of the vulcanized rubber compositions of the 11 types of tires, the tensile stress at 50% elongation at 25° C. and 180° C. and the loss tangent tan δ at 180° C. are measured, respectively, and the run flat durability is measured as the tire performance. The results are shown in Table 1.

Subsequently, these 11 types of tires are left standing in a large oven with air at 100° C. circulating therein for 24 hours. After left standing, the tires are subjected to evaluation of the tensile stress at 50% elongation at 180° C. The results are shown in Table 1. The maximum thickness of the side reinforcing rubber layer of the tires is set at 6.0 mm.

TABLE 1

| Unit of compounding recipe: Parts by mass | | Example | | | | | | | | | Comparative Example | |
|---|---|---|---|---|---|---|---|---|---|---|---|---|
| | | 1 | 2 | 3 | 4 | 5 | 6 | 7 | 8 | 9 | 1 | 2 |
| compounding recipe of rubber composition | Natural rubber *1 | 30.0 | 30.0 | 30.0 | 30.0 | 70.0 | 30.0 | 30.0 | 30.0 | 30.0 | 30.0 | 70.0 |
| | Modified conjugated diene based polymer P *2 | 70.0 | 70.0 | 70.0 | 70.0 | 30.0 | 70.0 | 70.0 | 70.0 | 70.0 | 70.0 | 30.0 |
| | Carbon black FEF (B) *3 | 60.0 | 60.0 | 100.0 | 55.0 | 60.0 | 70.0 | 60.0 | 90.0 | 85.0 | 60.0 | 50.0 |
| | Cashew-modified phenol resin (C) *4 | 1.2 | 3.5 | 0.9 | 1.2 | 1.2 | 1.2 | 2.5 | 1.2 | 1.2 | 2.5 | 3.0 |
| | Hexamethylenetetramine (D) *5 | 0.1 | 1.2 | 0.1 | 0.1 | 0.1 | 0.1 | 0.1 | 0.1 | 0.1 | 1.2 | 0.1 |
| | Thiuram based vulcanization accelerating agent TOT (E) *6 | 1.8 | 1.0 | 1.8 | 1.8 | 1.8 | 1.8 | 1.8 | 1.8 | 1.8 | 1.0 | 1.0 |
| | Sulfenamide based vulcanization accelerating agent NS (F) *7 | 3.3 | 3.0 | 3.3 | 3.3 | 3.3 | 3.3 | 3.3 | 3.3 | 3.3 | 3.0 | 3.3 |

TABLE 1-continued

| Unit of compounding recipe: Parts by mass | | 1 | 2 | 3 | Example 4 | 5 | 6 | 7 | 8 | 9 | Comparative Example 1 | 2 |
|---|---|---|---|---|---|---|---|---|---|---|---|---|
| | Antioxidant *8 | 1.0 | 1.0 | 1.0 | 1.0 | 1.0 | 1.0 | 1.0 | 1.0 | 1.0 | 1.0 | 1.0 |
| | Sulfur | 5.5 | 5.5 | 5.5 | 5.5 | 5.5 | 5.5 | 5.5 | 5.5 | 5.5 | 5.5 | 5.5 |
| [(C)/(B)] × 100 | | 2.0 | 5.8 | 0.9 | 2.0 | 2.0 | 2.0 | 4.2 | 1.3 | 1.4 | 4.2 | 6.0 |
| Physical properties of vulcanized rubber | Tensile stress at 50% elongation (MPa, 25° C.) | 6.3 | 6.7 | 6.7 | 6.3 | 6.3 | 6.4 | 6.9 | 6.7 | 6.6 | 6.2 | 6.4 |
| | Tensile stress at 50% elongation (MPa, 180° C.) | 6.2 | 6.3 | 6.6 | 6.2 | 6.2 | 6.3 | 6.5 | 6.6 | 6.5 | 5.7 | 6.1 |
| | Tensile stress at 50% elongation (MPa, 180° C.) after left standing at 100° C. for 24 hours | 7.0 | 7.4 | 7.5 | 6.9 | 6.8 | 7.1 | 7.7 | 7.3 | 7.3 | 6.7 | 7.1 |
| | tan δ at initial strain of 5%, dynamic strain of 1%, frequency of 52 Hz, and measurement temperature of 180° C. | 0.07 | 0.08 | 0.12 | 0.07 | 0.13 | 0.08 | 0.07 | 0.13 | 0.12 | 0.07 | 0.10 |
| Run flat durability index | | 151 | 121 | 132 | 149 | 116 | 142 | 130 | 131 | 133 | 100 | 103 |

[Note]
*1. Natural rubber: RSS #1
*2. Modified conjugated diene based polymer P: modified conjugated diene based polymer obtained in Production Example 1
*3. Carbon black FEF: N550, manufactured by Asahi Carbon Co., Ltd., trade name: "ASAHI #60"
*4. Cashew-modified phenol resin: manufactured by Sumitomo Bakelite Co., Ltd., trade name: "SUMILITERESIN PR-BSN-21"
*5. Hexamethylenetetramine: manufactured by Wako Pure Chemical Industries, Ltd.
*6. Vulcanization accelerating agent TOT: tetrakis(2-ethylhexyl)thiuram disulfide, manufactured by Ouchi Shinko Chemical Industrial Co., Ltd., trade name: "NOCCELER TOT-N"
*7. Vulcanization accelerating agent NS: N-(tert-butyl)-2-benzothiazolyl sulfenamide, manufactured by Sanshin Chemical Industry Co., Ltd., trade name: "SANCELER NS-G"
*8. Antioxidant 6C: N-(1,3-dimethylbutyl)-N'-phenyl-p-phenylenediamine, manufactured by Ouchi Shinko Chemical Industrial Co., Ltd., trade name: "NOCRAC 6C"

As is apparent from Table 1, the rubber compositions in Examples 1 to 9 have a tensile stress at 50% elongation at 180° C. (M50) of 6.2 MPa or more as a vulcanized rubber physical property. It is therefore shown that the run flat durability of the tires in Examples 1 to 9 is superior to that of the tires in Comparative Examples 1 to 2.

Examples 10 to 20 and Reference Examples 1 to 11

In the same manner as in Examples 1 to 9 and Comparative Examples 1 to 2, 22 types of passenger car radial run flat tires having a tire size of 225/45R17 91Y (LI91=615 Kg) are manufactured by the conventional method for evaluation of the run flat durability, the side cut resistance, and the steering stability. The following adhesive A is used as an adhesive in all of the cases. The physical properties of the reinforcing cords of the carcass ply and the evaluation results are shown in Tables 2 and 3.
<Adhesive A>
The dip solution of the first bath is A-1 comprising 16.5% by mass (weight of solid content) of EPOCROS K1010E (manufactured by Nippon Shokubai Co., Ltd., oxazoline-containing polymer), 6% by mass (weight of solid content) of ELASTRON BN27 (manufactured by Daiichi Kogyo Seiyaku Co., Ltd., water-based urethane resin), 7.5% by mass (weight of solid content) of DENACOL EX614B (manufactured by Nagase Kasei Kogyo Co., Ltd., multi-functional-type (4 or more functional groups) aliphatic epoxy resin), and 70% by mass of water. The clip solution of the second bath is A-2 comprising 524.01 parts by mass of water, 15.12 parts by mass of resorcinol, 16.72 parts by mass of formalin (37%), 4.00 parts by mass of caustic soda (10%), 233.15 parts by mass of vinylpyridine-styrene-butadiene copolymer latex (JSR0655, manufactured by JSR Corporation, solid content concentration: 41%), and 207.00 parts by mass of styrene-butadiene copolymer latex (JSR2108, manufactured by JSR Corporation, solid content concentration: 40%).

The carcass ply cords in Examples 10 to 20 and Reference Examples 1 to 11 are made of a multi-filament organic fiber including two multi-yarn bundles twisted to make a first twist and a second twist. The twisted cord of the organic fiber is immersed in a one-bath treatment liquid, and treated in a dry zone at 160° C. under a tension of 0.6 g/dtex for 60 seconds and in a hot zone at 240° C. under a tension of 0.6 g/dtex for 60 seconds. Subsequently, the cord is immersed again in a two-bath treatment liquid of resorcinol-formalin latex (RFL) based adhesive under a dip tension of 200 g, and treated again in a dry zone at 180° C. under a tension of 0.6 g/dtex for 60 seconds and in a hot zone for 60 seconds. The cord is thus subjected to heat treatment for 240 seconds in total, so as to be coated with the adhesive. In the hot zone of the final dip treatment, the temperature is finely adjusted in the range from 240° C. to 250° C. and the tension is finely adjusted in the range from 0.2 to 0.5 g/dtex, so that the intermediate elongation is adjusted.

In Tables 2 and 3, PET represents a polyethylene terephthalate fiber. A para-aramid fiber (KEVLAR (registered trademark) manufactured by Du Pont-Toray Co., Ltd.) is used as aramid.

TABLE 2

|  | Example | | | | | | | | | | |
|---|---|---|---|---|---|---|---|---|---|---|---|
|  | 10 | 11 | 12 | 13 | 14 | 15 | 16 | 17 | 18 | 19 | 20 |
| Type of cord | PET | PET | PET | PET | PET | PET | PET | Aramid | PET | PET | PET |
| Fineness (dtex/ply) | 1670/2 | 1670/2 | 1670/2 | 2200/2 | 2200/2 | 3340/2 | 3340/2 | 1670/2 | 2200/2 | 1670/2 | 1670/2 |
| Intermediate elongation (%) after heat treatment | 4.1 | 3.7 | 4.2 | 3.0 | 3.5 | 3.8 | 3.2 | 0.85 | 4.4 | 3.6 | 5.2 |
| Toughness (cN·%/dtex) | 48 | 51 | 60 | 56 | 58 | 82 | 65 | 29 | 42 | 38 | 60 |
| Thermal shrinkage rate (%) | 1.9 | 1.6 | 1.5 | 2.3 | 1.3 | 1.7 | 1.3 | 0.0 | 3.6 | 2.6 | 4.2 |
| Twist coefficient | 0.48 | 0.48 | 0.48 | 0.45 | 0.45 | 0.40 | 0.36 | 0.50 | 0.48 | 0.48 | 0.48 |
| Rubber composition for use in side reinforcing rubber layer and bead filler | Rubber composition in Example 1 | | | | | | | | | | |
| Side cut resistance | A | A | A | A | A | A | A | C | D | D | B |
| Steering stability | A | A | A | A | A | A | A | C | D | B | D |
| Run flat durability | A | A | A | A | A | A | A | C | B | B | B |

TABLE 3

|  | Reference Example | | | | | | | | | | |
|---|---|---|---|---|---|---|---|---|---|---|---|
|  | 1 | 2 | 3 | 4 | 5 | 6 | 7 | 8 | 9 | 10 | 11 |
| Type of cord | Aramid | PET | PET | PET | PET | PET | PET | PET | PET | PET | PET |
| Fineness (dtex/ply) | 1670/2 | 1670/2 | 1670/2 | 1670/2 | 2200/2 | 2200/2 | 3340/2 | 3340/2 | 2200/2 | 1670/2 | 1670/2 |
| Intermediate elongation (%) after heat treatment | 0.85 | 4.1 | 3.7 | 4.2 | 3.0 | 3.5 | 3.8 | 3.2 | 4.4 | 3.6 | 5.2 |
| Toughness (cN·%/dtex) | 29 | 48 | 51 | 60 | 56 | 58 | 82 | 65 | 42 | 38 | 60 |
| Thermal shrinkage rate (%) | 0.0 | 1.9 | 1.6 | 1.5 | 2.3 | 1.3 | 1.7 | 1.3 | 3.6 | 2.6 | 4.2 |
| Twist coefficient | 0.50 | 0.48 | 0.48 | 0.48 | 0.45 | 0.45 | 0.40 | 0.36 | 0.48 | 0.48 | 0.48 |
| Rubber composition for use in side reinforcing rubber layer and bead filler | Rubber composition in Comparative Example 1 | | | | | | | | | | |
| Side cut resistance | c | b | b | b | b | b | b | b | d | d | b |
| Steering stability | c | b | b | b | b | b | b | b | d | b | d |
| Run flat durability | c | b | b | b | b | b | b | b | d | b | d |

From Table 2, it can be seen that the tires and the run-flat tires, in particular, of the present invention exhibit excellent results in the run flat durability, with great improvement in the side cut resistance and the steering stability, which are balanced at a high level.

In particular, as is apparent from Table 2, the pneumatic tires (Examples 10 to 16) having a side reinforcing rubber layer and a bead filler using the rubber composition of the present invention, using an organic fiber cord having an intermediate elongation at a load of 1.5 cN/dtex of 4.2% or less and a toughness of 45 cN·%/dtex or more as a reinforcing cord of the carcass ply are superior in all of the run flat durability, the side cut resistance, and the steering stability than the pneumatic tires (Examples 17 to 20) having a side reinforcing rubber layer and a bead filler using the rubber composition of the present invention, using an organic fiber cord not satisfying one of an intermediate elongation at a load of 1.5 cN/dtex of 4.2% or less and a toughness of 45 cN·%/dtex or more as a reinforcing cord of the carcass ply.

In other words, the pneumatic tires in Examples 10 to 16 obtain a remarkable synergistic effect of having a side reinforcing rubber layer and a bead filler using the rubber composition of the present invention and using an organic fiber cord having an intermediate elongation at a load of 1.5 cN/dtex of 4.2% or less and a toughness of 45 cN·%/dtex or more as a reinforcing cord of the carcass ply, in comparison with the pneumatic tires in Examples 17 to 20.

On the other hand, as is apparent from Table 3, it is recognized that the pneumatic tires (Reference Examples 2 to 8) having a side reinforcing rubber layer and a bead filler using the rubber composition in Comparative Example 1, using an organic fiber cord having an intermediate elongation at a load of 1.5 cN/dtex of 4.2% or less and a toughness of 45 cN·%/dtex or more as a reinforcing cord of the carcass ply are superior in any one of the run flat durability, the side cut resistance, and the steering stability than the pneumatic tires (Reference Examples 1 and 9 to 11) having a side reinforcing rubber layer and a bead filler using the rubber composition in Comparative Example 1, using an organic fiber cord not satisfying one of an intermediate elongation at a load of 1.5 cN/dtex of 4.2% or less and a toughness of 45 cN·%/dtex or more as a reinforcing cord of the carcass ply.

However, the remarkable synergistic effect obtained in the pneumatic tires in Examples 10 to 16 is not exhibited in the pneumatic tires in Reference Examples 2 to 8 in comparison with the pneumatic tires in Reference Examples 1 and 9 to 11. In other words, the pneumatic tires in Examples 10 to 16 can exhibit the remarkable synergistic effect only due to the combination of the rubber composition of the present invention and the reinforcing cord of the carcass ply of the present invention.

The pneumatic tires in Examples 10 to 16 are vastly superior in all of the run flat durability, the side cut resistance, and the steering stability than the pneumatic tires in Reference Examples 2 to 8.

INDUSTRIAL APPLICABILITY

The tire of the present invention has at least one member selected from the group consisting of a side reinforcing rubber layer and a bead filler using a rubber composition having vulcanized rubber physical properties for suppressing decrease in the elastic modulus at high temperature, so that the run flat durability can be improved and because of using an organic fiber cord having a specific intermediate elongation and a specific toughness as a reinforcing cord of the carcass ply, the run flat durability is excellent as well as the side cut resistance and the steering stability are also improved, and thus the tire can be suitably used as a run flat tire.

REFERENCE SIGNS LIST 1, 1' Bead cores
2 Carcass layer
3 Side rubber layer
4 Tread rubber layer
5 Belt layer
6 Inner liner
7 Bead filler
8 Side reinforcing rubber layer
10 Shoulder zone

The invention claimed is:

1. A tire having at least one member selected from the group consisting of a side reinforcing rubber layer and a bead filler using a rubber composition having a tensile stress at 50% elongation at 180° C. (M50) of 6.2 MPa or more when measured in accordance with JIS K 6251:2010 as a vulcanized rubber physical property,
wherein the rubber composition is prepared by mixing a rubber component comprising 35% by mass or more of a modified conjugated diene based polymer, a reinforcing filler, a thermosetting resin, a thiuram based vulcanization accelerating agent, a vulcanization accelerating agent other than the thiuram based vulcanization accelerating agent, and a sulfur-containing vulcanizing agent, wherein the rubber composition is prepared by mixing 40 to 100 parts by mass of the reinforcing filler, 1.1 to 2.5 parts by mass of the thiuram based vulcanization accelerating agent, 2 to 6 parts by mass of the vulcanization accelerating agent other than the thiuram based vulcanization accelerating agent, and 2 to 10 parts by mass, in terms of a sulfur content, of the sulfur-containing vulcanizing agent based on 100 parts by mass of the rubber component, wherein the thermosetting resin is mixed such that a mass ratio [amount of thermosetting resin mixed/amount of reinforcing filler mixed] of 0.001 to 0.043 is obtained.

2. The tire according to claim 1, wherein the rubber composition has a tensile stress at 50% elongation at 180° C. (M50) of 6.8 to 7.7 MPa as a vulcanized rubber physical property after the tire is left standing at 100° C. for 24 hours.

3. The tire according to claim 1, wherein the rubber composition has a tan δ of 0.13 or less at an initial strain of 5%, a dynamic strain of 1%, a frequency of 52 Hz, and a measurement temperature of 180° C.

4. The tire according to claim 1, wherein the modified conjugated diene based polymer is an amine-modified polybutadiene.

5. The tire according to claim 4, wherein the amine-modified polybutadiene is a primary amine-modified polybutadiene.

6. The tire according to claim 1, wherein the amount of the thiuram based vulcanization accelerating agent mixed is more than the amount of the thermosetting resin mixed.

7. A tire having, as a framework, a carcass layer comprising at least one carcass ply, a reinforcing cord of the carcass ply being an organic fiber cord having an intermediate elongation of 4.2% or less under a load of 1.5 cN/dtex and a toughness of 45 cN %/dtex or more, and the tire having at least one member selected from the group consisting of the side reinforcing rubber layer and the bead filler using the rubber composition according to claim 1.

8. The tire according to claim 7, wherein
the reinforcing cord is subjected to an adhesive treatment using an adhesive comprising at least one selected from the group consisting of a thermoplastic polymer (A), a thermal reaction-type aqueous urethane resin (B) and an epoxide compound (C) as a one-bath treatment liquid, and a resorcinol-formalin latex adhesive as a two-bath treatment liquid, and
a main chain of the thermoplastic polymer (A) comprises at least one of an ethylenic addition polymer and a urethane polymer having substantially no carbon-carbon double bond having addition reactivity and mainly composed of a straight chain-structure, and has at least one cross-linkable functional group as a pendant group.

9. The tire according to claim 7, wherein the reinforcing cord has a thermal shrinkage rate after heat treatment of 0.5 to 3.0%.

10. The tire according to claim 7, wherein the reinforcing cord removed from the tire has an intermediate elongation of 6.0% or less under a load of 1.5 cN/dtex.

11. The tire according to claim 7, wherein the reinforcing cord has a twist coefficient of 0.35 to 0.50.

12. The tire according to claim 7, wherein the reinforcing cord is made of polyethylene terephthalate.

* * * * *